United States Patent
Cunningham

(10) Patent No.: US 11,505,473 B2
(45) Date of Patent: Nov. 22, 2022

(54) PREDICTIVE TOOL FOR MONITORING RO AND NF MEMBRANES

(71) Applicant: BP Exploration Operating Company Limited, Middlesex (GB)

(72) Inventor: George Leslie Cunningham, Scotland (GB)

(73) Assignee: BP EXPLORATION OPERATING COMPANY LIMITED, Middlesex (GB)

(*) Notice: Subject to any disclaimer, the term of this patent is extended or adjusted under 35 U.S.C. 154(b) by 254 days.

(21) Appl. No.: 15/734,419

(22) PCT Filed: Jun. 6, 2019

(86) PCT No.: PCT/GB2019/051579
§ 371 (c)(1),
(2) Date: Dec. 2, 2020

(87) PCT Pub. No.: WO2019/234439
PCT Pub. Date: Dec. 12, 2019

(65) Prior Publication Data
US 2021/0171362 A1  Jun. 10, 2021

(30) Foreign Application Priority Data
Jun. 8, 2018 (GB) .................................. 1809494

(51) Int. Cl.
*C02F 1/00* (2006.01)
*B01D 61/02* (2006.01)
(Continued)

(52) U.S. Cl.
CPC ............ *C02F 1/008* (2013.01); *B01D 61/025* (2013.01); *B01D 61/026* (2022.08);
(Continued)

(58) Field of Classification Search
CPC .......... C02F 1/008; C02F 1/441; C02F 1/442; C02F 1/444; C02F 5/00; C02F 9/00;
(Continued)

(56) References Cited

U.S. PATENT DOCUMENTS

2011/0240557 A1  10/2011  Goodfellow
2015/0053596 A1  2/2015  Kageyama et al.

FOREIGN PATENT DOCUMENTS

CN  104418448 A  3/2015
JP  2018012061 A  1/2018
(Continued)

OTHER PUBLICATIONS

PCT/GB2019/051579 International Search Report and Written Opinion dated Aug. 20, 2019 (19 p.).
(Continued)

*Primary Examiner* — Patrick Orme
(74) *Attorney, Agent, or Firm* — Conley Rose, P.C.

(57) ABSTRACT

A predictive system for monitoring fouling of membranes of a desalination or water softening plant includes ultrafiltration (UF) membranes, reverse osmosis (RO) membranes, and/or nanofiltration (NF) membranes. In addition, the system includes one or more UF skids including a plurality of UF units. Each UF unit contains therein a plurality of UF membranes. Further, the system includes one or more RO/NF skids including one or more RO/NF arrays. Each of the one or more RO/NF arrays includes a plurality of RO units, with each RO unit containing therein a plurality of RO membranes, a plurality of NF units, with each NF unit containing therein a plurality of NF membranes, or a combination thereof. Still further, the system includes UF sensors and/or RO/NF sensors. The system also includes a controller comprising a processor in signal communication with the UF sensors and/or the RO/NF sensors.

38 Claims, 4 Drawing Sheets

(51) Int. Cl.
    *B01D 61/12* (2006.01)
    *B01D 61/14* (2006.01)
    *B01D 61/22* (2006.01)
    *B01D 65/02* (2006.01)
    *C02F 9/00* (2006.01)
    *C02F 5/00* (2006.01)
    *B01D 61/58* (2006.01)
    *C02F 1/44* (2006.01)
    *C02F 103/08* (2006.01)

(52) U.S. Cl.
    CPC ........... *B01D 61/027* (2013.01); *B01D 61/12* (2013.01); *B01D 61/145* (2013.01); *B01D 61/146* (2022.08); *B01D 61/22* (2013.01); *B01D 61/58* (2013.01); *B01D 65/02* (2013.01); *C02F 9/00* (2013.01); *B01D 2311/10* (2013.01); *B01D 2311/14* (2013.01); *B01D 2311/16* (2013.01); *B01D 2321/04* (2013.01); *B01D 2321/16* (2013.01); *B01D 2321/40* (2013.01); *C02F 1/441* (2013.01); *C02F 1/442* (2013.01); *C02F 1/444* (2013.01); *C02F 5/00* (2013.01); *C02F 2103/08* (2013.01); *C02F 2209/001* (2013.01); *C02F 2209/008* (2013.01); *C02F 2209/02* (2013.01); *C02F 2209/03* (2013.01); *C02F 2209/10* (2013.01); *C02F 2209/40* (2013.01); *C02F 2303/16* (2013.01); *C02F 2303/20* (2013.01)

(58) Field of Classification Search
    CPC ............ C02F 2103/08; C02F 2209/001; C02F 2209/008; C02F 2209/02; C02F 2209/03; C02F 2209/05; C02F 2209/10; C02F 2209/40; C02F 2303/16; C02F 2303/20; C02F 2303/22; B01D 61/025; B01D 61/026; B01D 61/027; B01D 61/12; B01D 61/145; B01D 61/146; B01D 61/22; B01D 61/58; B01D 65/02; B01D 65/10; B01D 2311/10; B01D 2311/14; B01D 2311/16; B01D 2311/246; B01D 2321/04; B01D 2321/16; B01D 2321/40; Y02A 20/131
    See application file for complete search history.

(56) References Cited

FOREIGN PATENT DOCUMENTS

| | | |
|---|---|---|
| JP | 2018012062 A | 1/2018 |
| WO | 2010/109265 A1 | 9/2010 |
| WO | 2018/015223 A1 | 1/2018 |
| WO | 2018/053304 A1 | 3/2018 |

OTHER PUBLICATIONS

Chinese Office Action dated Jul. 5, 2022, for Chinese Application No. 201980053405.2 (9 p.).
English Translation of Chinese Office Action dated Jul. 5, 2022, for Chinese Application No. 201980053405.2 (8 p.).

PREDICTIVE TOOL FOR MONITORING RO AND NF MEMBRANES

CROSS-REFERENCE TO RELATED APPLICATIONS

The present application is a 35 U.S.C. § 371 U.S. National Phase entry of, and claims priority to, PCT Application No. PCT/GB2019/051579 filed Jun. 6, 2019, which claims priority to British Patent Application No. 1809494.6, filed Jun. 8, 2018, both of which are hereby incorporated herein by reference in their entireties for all purposes.

STATEMENT REGARDING FEDERALLY SPONSORED RESEARCH OR DEVELOPMENT

Not applicable.

TECHNICAL FIELD

This disclosure relates to a predictive method, system and tool for monitoring ultrafiltration (UF), reverse osmosis (RO) and nanofiltration (NF) membranes of a desalination or water softening plant. More specifically, this disclosure relates to a method, system, and tool that enable predicting, for one or more UF or RO/NF skids, a time until which a cleaning of the one or more UF or RO/NF skids or banks or arrays thereof is indicated. Still more specifically, this disclosure relates to method, system, and tool for predicting, for one or more UF or RO/NF skids, a time until which a cleaning is indicated, and scheduling an appropriate cleaning routine and/or a time for such a cleaning.

BACKGROUND

Enhanced oil recovery (EOR) can be performed by injecting a continuous flow or a slug of low salinity desalinated or softened water into a reservoir. There is an optimal composition (e.g., an optimum salinity) for the injection water that provides the benefit of enhanced oil recovery while mitigating the risk of formation damage, and the optimum composition may vary within a single reservoir owing to the rock composition varying spatially across a reservoir (both in a vertical and transverse direction). For example, where an oil-bearing formation comprises rock that contains high levels of swelling clays, formation damage may be avoided, while still releasing oil from the formation, when the injection water has a total dissolved solids (TDS) content in the range of from about 200 to 10,000 ppm, and a particular ratio (e.g., less than 1 or less than 0.9) of the concentration of multivalent cations in the low salinity or softened injection water to the concentration of multivalent cations in the connate water of the reservoir.

SUMMARY

Herein disclosed is a predictive system for monitoring fouling of membranes of a desalination or water softening plant comprising ultrafiltration (UF) membranes, reverse osmosis (RO) membranes, nanofiltration (NF) membranes, or a combination thereof, the system comprising: one or more UF skids comprising a plurality of UF units, each UF unit containing therein a plurality of UF membranes; one or more RO/NF skids comprising one or more RO/NF arrays, wherein each of the one or more RO/NF arrays comprises a plurality of RO units, with each RO unit containing therein a plurality of RO membranes, a plurality of NF units, with each NF unit containing therein a plurality of NF membranes; or a combination thereof, UF sensors configured to measure one or more of inlet temperature, inlet pressure, outlet pressure, flow rate, or a combination thereof for each of the one or more UF skids; RO/NF sensors configured to measure inlet temperature, feed pressure, outlet pressure, feed flow rate, permeate flow rate, total dissolved solids (TDS) in the permeate stream, or a combination thereof for each of the one or more RO/NF arrays; or a combination thereof; and a controller comprising a processor in signal communication with the UF sensors, the RO/NF sensors, or a combination thereof, wherein the controller is configured to: receive data from one or more of the UF sensors, the RO/NF sensors, or both; calculate, utilizing the data from one or more of the UF sensors, for each of the one or more UF skids, one or more UF parameters; compare each of the one or more UF parameters to a performance threshold, wherein the performance threshold indicates a time at which a cleaning in place (CIP) of the UF skid is to be performed; predict an estimated time until which the one or more parameters of a UF skid will reach the performance threshold; calculate, utilizing the data from one or more of the RO/NF sensors, one or more RO/NF parameters; compare each of the one or more RO/NF parameters to a performance threshold, wherein the performance threshold indicates a time at which a cleaning in place (CIP) of the RO/NF skid is to be performed; and predict an estimated time until which the one or more parameters of an RO/NF skid will reach the performance threshold.

Also disclosed herein is a method for monitoring fouling of membranes of a desalination or water softening plant comprising reverse osmosis (RO) membranes, nanofiltration (NF) membranes, or a combination thereof, the method comprising: predicting, for one or more RO/NF skids, a time until which a cleaning in place (CIP) of the one or more RO/NF skids is indicated, wherein each of the one or more RO/NF skids comprises one or more RO/NF arrays, wherein each of the one or more RO/NF arrays comprises a plurality of RO units and each RO unit contains therein a plurality of RO membranes, a plurality of NF units and each NF unit contains therein a plurality of NF membranes, or a combination thereof, wherein the predicting comprises: calculating and/or monitoring one or more RO/NF parameters, comparing each of the one or more RO/NF parameters to a performance threshold, wherein the performance threshold indicates a time at which a cleaning in place (CIP) of the RO/NF skid based on that parameter is to be performed, and estimate a time until which each of the one or more RO/NF parameters will reach the performance threshold therefor, and predicting as the time until which a cleaning in place (CIP) of the one or more RO/NF skids is indicated as the lowest time estimated from among the estimated times until which each of the one or more RO/NF parameters will reach the performance threshold therefor.

Further disclosed herein is a computer system operable for monitoring fouling of membranes of a desalination or water softening plant comprising ultrafiltration (UF) membranes, reverse osmosis (RO) membranes, nanofiltration (NF) membranes, or a combination thereof, the system comprising: a controller comprising a processor configured to: receive as inputs: for one or more UF skids comprising a plurality of UF units, each UF unit containing therein a plurality of UF membranes: an inlet temperature, inlet pressure, outlet pressure, flow rate, or a combination thereof; for one or more RO/NF skids comprising one or more RO/NF arrays, wherein each of the one or more RO/NF arrays comprises a plurality of RO units, each RO unit containing therein a plurality of RO membranes, a plurality of NF units, each NF unit containing therein a plurality of NF membranes, or a combination thereof: inlet temperature, feed pressure, outlet pressure, feed flow rate, permeate flow rate, total dissolved solids (TDS) in the permeate streams from, or a combination thereof for each of the one or more RO/NF arrays; or a combination thereof, utilize the inputs: for the one or more UF skids to calculate and/or monitor, for each of the one or more UF skids, one or more UF parameters, for the one or more RO/NF skids to calculate and/or monitor one or more RO/NF parameters; or a combination thereof; compare: each of the one or more UF parameters to a performance threshold therefor, wherein the performance threshold indicates a time at which a cleaning in place (CIP) of the UF skid is to be performed, and predict an estimated time until which each of the one or more parameters of a UF skid will reach the performance threshold therefor; each of the one or more RO/NF parameters to a performance threshold therefor, wherein the performance threshold indicates a time at which a cleaning in place (CIP) of the RO/NF skid is to be performed, and predict an estimated time until which each of the one or more RO/NF parameters of an RO/NF skid will reach the performance threshold therefor; or a combination thereof; and predict a time until which a cleaning in place (CIP) of each of the one or more RO/NF skids, UF skids, or both is indicated as the lowest time estimated from among the estimated times until which each of the one or more RO/NF parameters or UF parameters, respectively, will reach the performance threshold therefor.

While multiple embodiments are disclosed, still other embodiments will become apparent to those skilled in the art from the following detailed description. As will be apparent, certain embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

DETAILED DESCRIPTION

Figure 1:
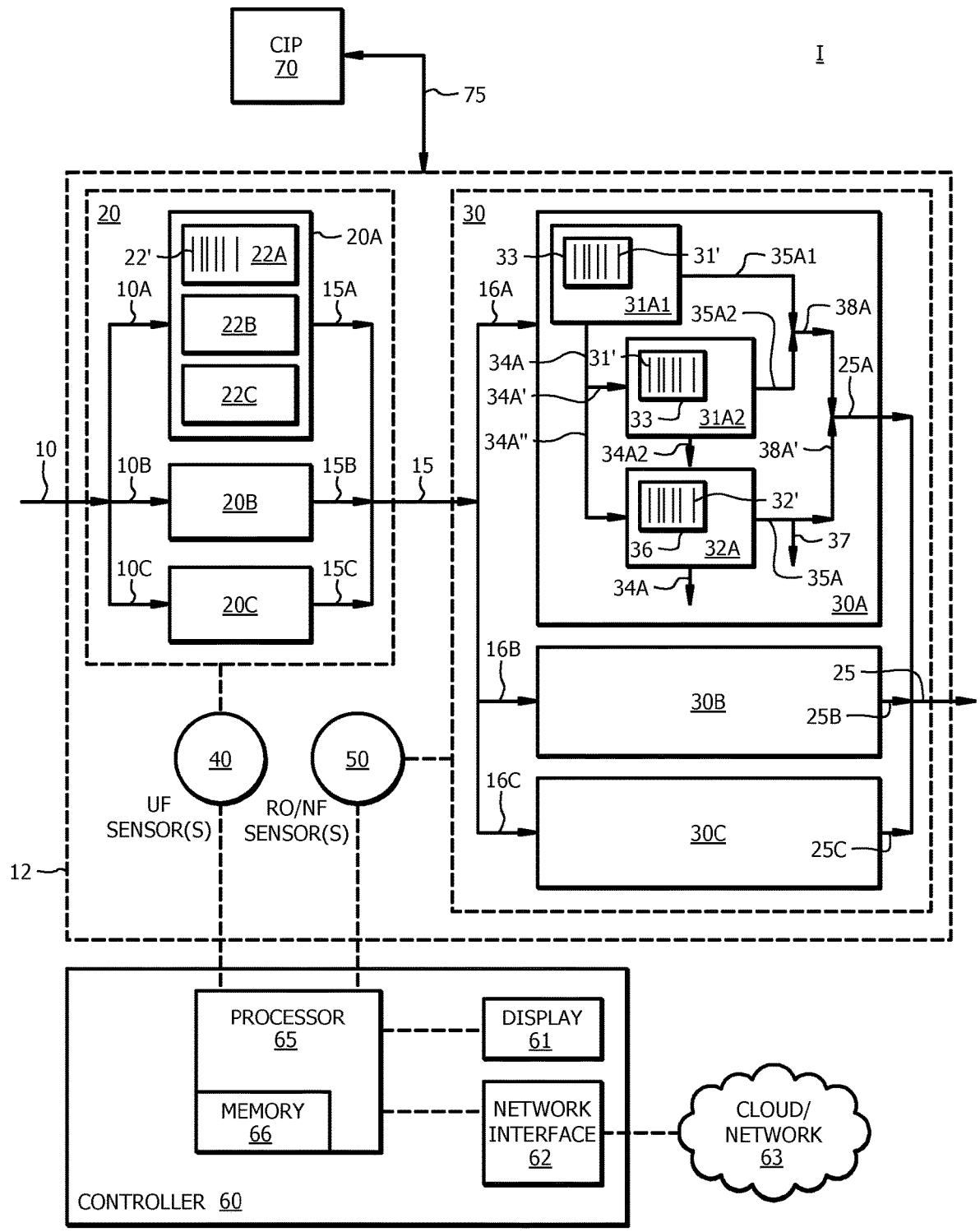
FIG. 1 is a schematic of a predictive system I for monitoring fouling of membranes of a desalination or water softening plant comprising ultrafiltration (UF) membranes, reverse osmosis (RO) membranes, nanofiltration (NF) membranes, or a combination thereof, according to an embodiment of this disclosure.

As utilized herein, "membrane" refers to elements for microfiltration ultrafiltration (UF), reverse osmosis (RO), or nanofiltration (NF). Technically, MF/UF elements can be classified as filters, but, for simplicity, are referred to herein as membranes.

"High salinity feed water" or "feed water" is the feed water for a desalination or water softening plant and is typically, for a desalination plant, seawater (SW), estuarine water, aquifer water or mixtures thereof, and, for a water softening plant, may be or may further comprise produced water.

"Low salinity" water is the water resulting from the removal of at least a portion of the salt (e.g., NaCl) or other total dissolved solids (TDS) from a high salinity feed water or PW. As used herein, low salinity water can be water having a salinity or TDS content of less than 10,000, 7,500, or 5,000, or in the range of from 200 to 10,000, from 500 to 5,000, or from 1,000 to 5,000 ppm.

"Softened water" is the water resulting from the removal of at least some amount of hardness ions (e.g., multivalent cations including magnesium and calcium) from a high salinity feed water or PW. As utilized herein, softened water can be water having a hardness (expressed, for example, in grains per gallon (or ppm) as calcium carbonate equivalent) of less than or equal to about 1 grain per gallon (gpg) or 17.0 ppm (mg/L).

An "ultrafiltration (UF) filtration unit" comprises a pressure vessel containing one or more UF elements. A UF array can contain a plurality of pressure vessels arranged, for example, in banks.

A "reverse osmosis (RO) filtration unit" comprises a pressure vessel, alternatively called a housing, containing one or more RO membrane elements. An RO array can contain a plurality of pressure vessels arranged, for example, in banks.

A "nanofiltration (NF) filtration unit" comprises a pressure vessel containing one or more NF elements. An NF array can contain a plurality of pressure vessels arranged, for example, in banks.

The UF, RO, and NF units may be arranged in rows of units in series, and an RO "bank" of a desalination or water softening plant can comprise a plurality of RO units or rows thereof. Similarly, an NF "bank" of a desalination or water softening plant can comprise a plurality of NF units or rows thereof. Likewise, an UF "bank" of a desalination or water softening plant can comprise a plurality of UF units or rows thereof.

An RO "stage" or "array" of a desalination or water softening plant is a group of RO filtration units, banks or rows connected together in parallel. Similarly, an NF "stage" or "array" of a desalination or water softening plant" is a group of NF filtration units, banks or rows connected together in parallel. A "stage" or "array" can thus comprise a plurality of units, rows, or banks. For example, an RO skid may comprise a first stage RO (or "first RO array") and a second stage RO (or "second RO array"), as described with reference to the embodiment of FIG. 3.

"TDS content" is to the total dissolved solids content of an aqueous stream and typically has units of mg/L.

The unit "ppmv" is parts per million on a volume basis and is approximately equivalent to the unit "mg/L". Unless noted otherwise, when utilized herein, "ppm" means "ppmv".

"Transmembrane pressure" (TMP) is the pressure difference across filter membranes, and "differential pressure" (DP) is the pressure drop along the fibers of a membrane. The net driving pressure (NDP) across an RO or NF membrane takes into account the skid feed pressure, pressure drop between the feed and reject stream, osmotic pressure and permeate backpressure.

The low salinity or softened water can be produced by a number of filtration or membrane processes utilizing a variety of filters or membranes. For example, low salinity or softened water may be produced using a combination of microfiltration (MF), ultrafiltration (UF), forward or reverse osmosis (RO), nanofiltration (NF), or a combination thereof, each of which employs a particular element or membrane. These membranes are susceptible to fouling, due to, for example, scaling and biofouling, aging, and damage, such as physical damage. Membrane management to determine how and when to clean and/or replace the various membranes is important for maintaining a production capacity and composition of a low salinity or softened water utilized for downstream EOR. As cleaning of membranes (e.g., rows, banks, arrays, or skids comprising the membranes) can involve a cleaning-in-place (CIP) skid, and as the number of such CIP skids available at a low salinity or softened water production location (e.g., an offshore platform) may be limited, scheduling the cleaning of the various membranes can be complicated, and, if not correctly managed, may result in a bottleneck in the production of a desired amount or composition of low salinity or softened EOR water. For example, if a row, bank, array, or skid of membranes is not scheduled for a clean until a fail condition has occurred and the unit has to be taken offline, it may arise that multiple rows, banks, arrays, or skids are offline for a cleaning at the same time, in which case the units remaining online may be insufficient to provide a desired production capacity or composition for the low salinity or softened water.

As described herein a predictive method, system, and tool for monitoring the performance of membranes of a desalination or water softening plant can be based on key performance indicators or parameters and trends thereof that can be monitored to provide alerts relating to when the membranes are predicted to need a cleaning or replacement, and optionally to further suggest a cause of the changes in the monitored parameters (e.g., a cause of an observed trend), suggest a suitable cleaning routine, and/or schedule a time for or initiate such a cleaning. The present disclosure relates to predictive methods, systems, and tool (e.g., software) for monitoring membranes of a desalination or water softening (e.g., a sulfate reduction plant (SRP)). The membranes can comprise ultrafiltration (UF), reverse osmosis (RO) and/or nanofiltration (NF) membranes. Via the herein-disclosed methods, systems, and tool, various key performance indicators or 'parameters' and trends can be monitored, alerts provided, and a suitable response thereto suggested and/or initiated or performed manually or automatically. In one or more embodiments, the herein-disclosed performance monitoring system may be fully automated, whereby the root cause analyses of the trends or alerts are inputted into the system and the system outputs an instruction or automatically initiates changes to the plant to deal with an alert situation.

The herein-disclosed predictive monitoring system, method, and tool can be utilized to monitor fouling, aging, damage, and cleaning of membranes. In one or more embodiments, the system can automatically implement an appropriate cleaning routine and/or select or predict a date (i.e., schedule a time) for the cleaning of a group of UF units (e.g., a UF membrane row, bank or skid), a group of RO units (e.g., an RO stage, bank, or array), and/or a group of NF units (e.g., an NF stage, bank, or array). In one or more embodiments, the system can be utilized to implement a protocol for shutting in banks of filtration units, RO/NF units, groups of units, or individual units to determine where fouled or damaged membrane elements are located. The system may also be operable to provide suggested times when to replace aged membranes.

As discussed in detail hereinbelow, the method, system, and tool of this disclosure enable proactive or predictive, rather than solely reactive, performance monitoring of membranes. The method, system, and tool can be utilized to monitor various key performance indicators or parameters and trends thereof, and thereby detect membrane damage, fouling, and aging within groups (e.g., rows, banks, stages, arrays, or skids) of membranes. In one or more embodiments, the performance monitoring can be used to monitor individual skid or array performance, and determine and/or initiate a suitable cleaning program (e.g., monitor a frequency of backwashes (BWs), initiate chemically enhanced backwashes (CEBs), initiate cleans-in-place (CIPs) for groups of UF membranes, determine chemicals utilized, etc.), or a suitable cleaning program (e.g., frequency of CIPs, chemicals utilized, etc.) for groups of RO/NF membranes. The method, system, and tool may be further operable, in one or more embodiments, to monitor the effectiveness of a cleaning program, and predict membrane replacement.

Herein disclosed is a predictive system for monitoring fouling of membranes of a desalination or water softening plant comprising ultrafiltration (UF) membranes, reverse osmosis (RO) membranes, nanofiltration (NF) membranes, or a combination thereof. In one or more embodiments, the predictive system comprises one or more UF skids, one or more RO/NF skids, or a combination thereof; one or more UF sensors, one or more RO/NF sensors, or a combination thereof; and a controller comprising a processor. Description of a predictive system for monitoring fouling of membranes of a desalination or water softening plant will now be made with reference to FIG. 1, which is a schematic of a predictive system I for monitoring fouling of membranes of a desalination or water softening system (indicated by dotted box 12) comprising UF membranes, RO membranes, NF membranes, or a combination thereof, according to an embodiment of this disclosure.

In one or more embodiments, the predictive system of this disclosure comprises one or more UF skids, one or more RO/NF skids, or a combination thereof. The UF skid(s) are arranged upstream of the RO/NF skids in order to remove suspended solids from a high salinity feed water. Each of the one or more UF skids comprises a plurality of UF vessels or 'units', and each UF unit contains therein a plurality of UF elements or filters (also referred to herein as UF 'membranes'). Each of the one or more RO/NF skids comprises one or more RO/NF arrays, wherein each of the one or more RO/NF arrays comprises a plurality of RO vessels or 'units', with each RO unit containing therein a plurality of RO membranes, a plurality of NF vessels or 'units', with each NF unit containing therein a plurality of NF membranes; or a combination thereof. In one or more embodiments, an RO/NF skid comprises only RO units or only NF units. For example, when the system comprises a SRP comprising UF units and NF units but no RO units, the 'RO/NF' skids may comprise only NF units/arrays, and RO units/arrays may be absent. In other embodiments, an RO/NF skid can comprise both RO units and NF units, including any ratio or mixture thereof.

Figure 2:
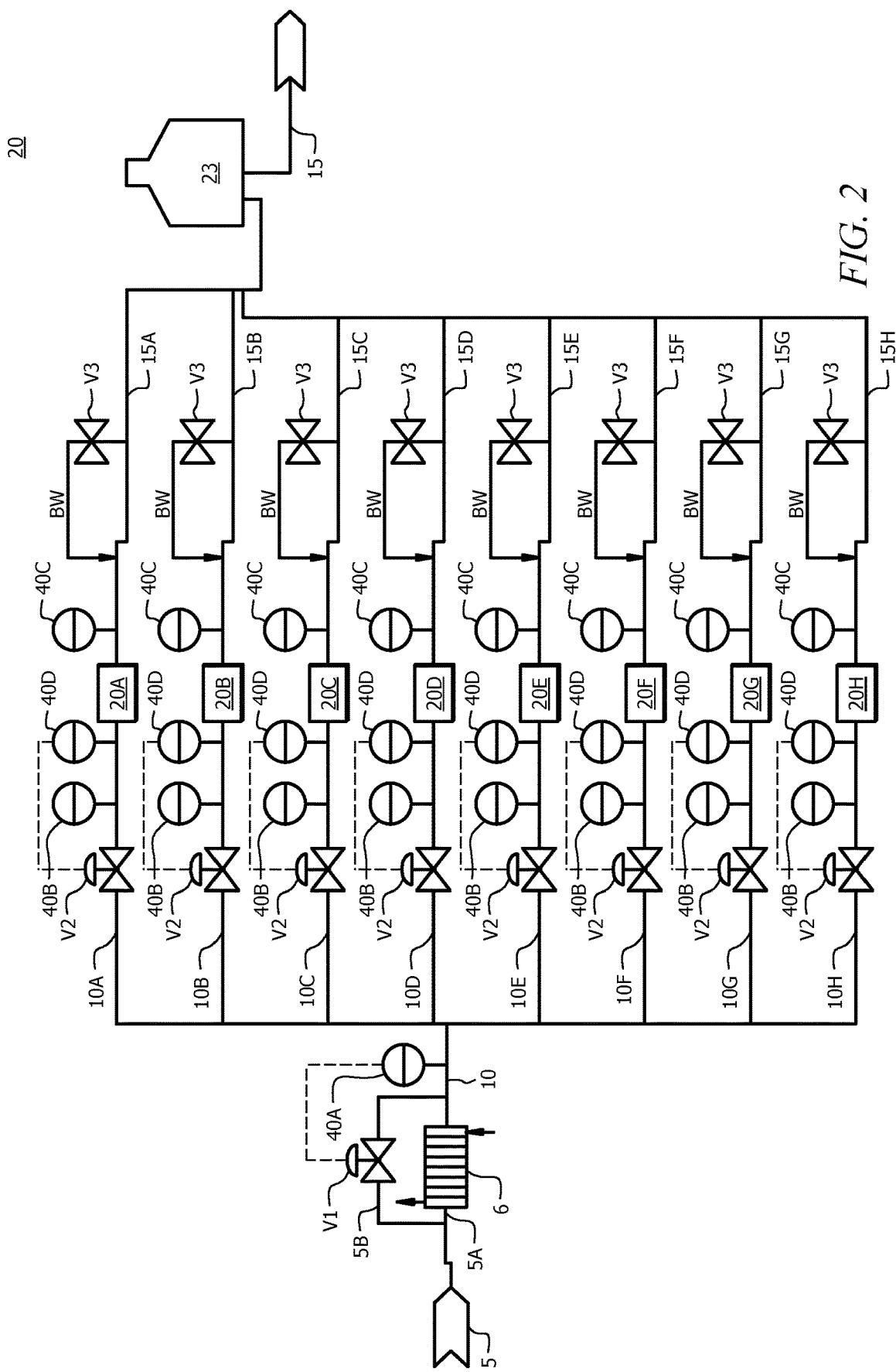
FIG. 2 is a schematic of an UF section 20, according to an embodiment of this disclosure.

A predictive system of this disclosure can comprise one or more UF skids of an ultrafiltration section, as indicated by dotted box 20 in FIG. 1. Each of the one or more UF skids contains therein a plurality of UF filters 22'. Although technically filters, the UF filters may also be referred to herein as UF 'membranes'. The predictive system may comprise any number of UF skids. For example, as shown in FIG. 1, a predictive system may comprise three UF skids 20A, 20B, and 20C. Each UF skid 20A/20B/20C contains therein a plurality of UF vessels or units 22, with three UF units indicated for skid 20A skid (UF units 22A, 22B, and 22C) in the embodiment of FIG. 1. Each UF unit or vessel 22A/22B/22C contains therein a plurality of UF elements or filters (also referred to herein as UF membranes) 22'. (The UF skids 20A, 20B, 20C may contain the same or a different number and/or arrangement of UF units; the UF units 22A, 22B, 22C may contain the same or a different number and/or arrangement of UF membranes 22'.) FIG. 2 depicts an UF section 20 comprising 8 ultrafiltration skids, 20A-20H. Each UF skid 20A-20H contains therein a plurality of UF vessels or units 22, and each UF unit or vessel 22 contains therein a plurality of UF elements or filters 22'.

Figure 3:
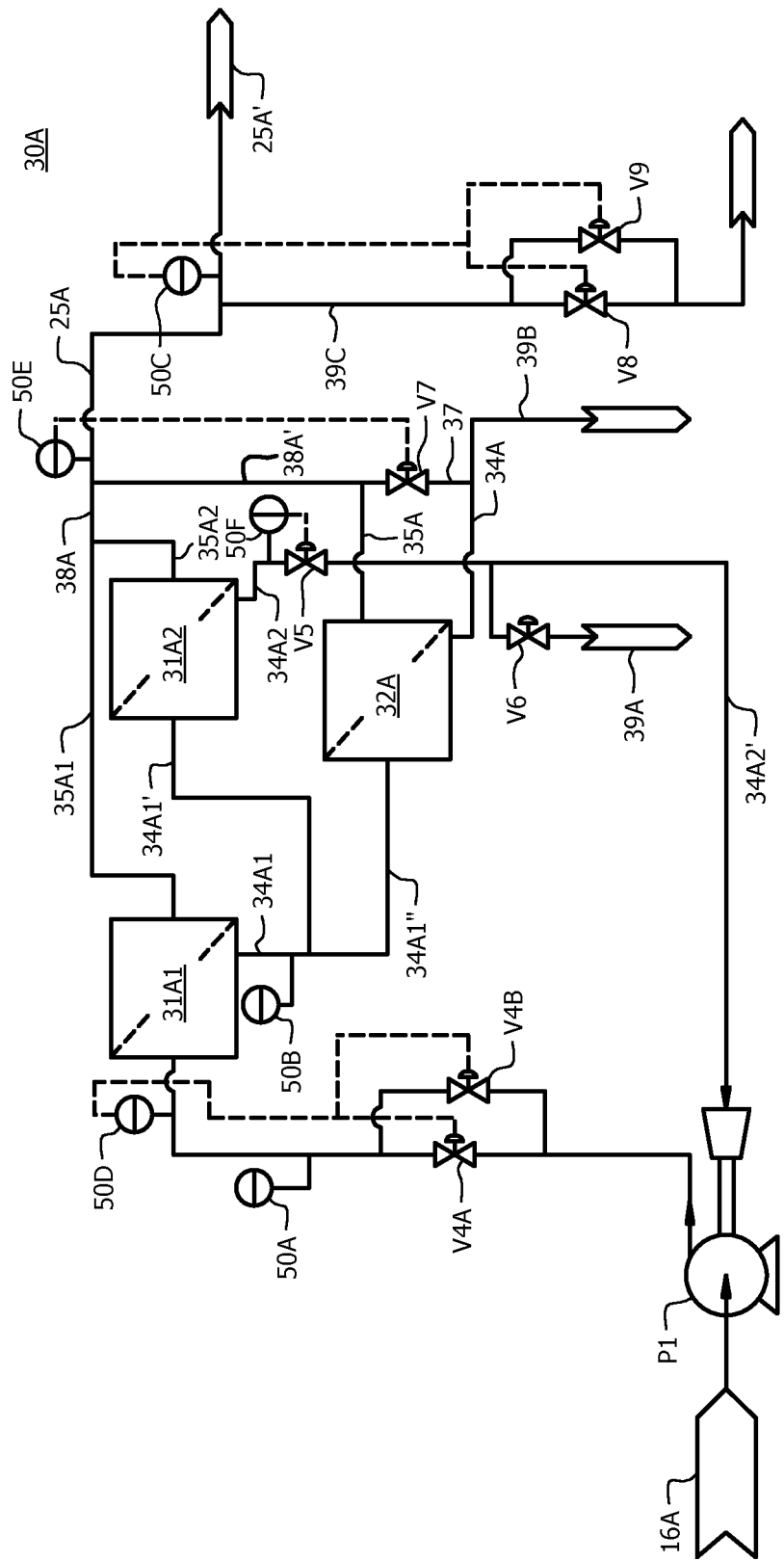
FIG. 3 is a schematic of an RO/NF array 30A, according to an embodiment of this disclosure.

A predictive system of this disclosure can comprise one or more RO/NF skids of an RO/NF section, as indicated by dotted box 30 in FIG. 1. The system may comprise any number of RO/NF skids. Each RO/NF skid comprises one or more RO/NF arrays, and each of the one or more RO/NF arrays comprises a plurality of RO vessels or units, a plurality of NF vessels or units, or a combination thereof. An RO/NF skid may comprise any number of RO/NF arrays comprising any number of RO arrays and/or NF arrays. For example, as shown in FIG. 1, a predictive system of this disclosure may comprise three RO/NF skids, as indicated by boxes 30A, 30B, and 30C in the embodiment of FIG. 1. Each RO/NF skid may comprise one or more RO arrays, one or more NF arrays, or a combination thereof. In the embodiment of FIG. 1, first RO/NF skid 30A comprises first RO array 31A1 and second RO array 31A2, each RO array 31A1 and 31A2 contains therein a plurality of RO units or vessels 33, and each RO unit or vessel 33 contains therein a plurality of RO membranes 31'. In the embodiment of FIG. 1, first RO/NF skid 30A further comprises NF array 32A. Each NF array 32A comprises a plurality of NF units, and each NF unit contains therein a plurality of NF membranes. For example, NF array 32A contains a plurality of NF units 36, each NF unit containing therein a plurality of NF membranes 32'. (The RO/NF skids 30A, 30B, 30C may each contain the same or a different number and/or arrangement of RO units/arrays and/or NF units/arrays operable to provide RO/NF water in lines 25A, 25B, and 25C, respectively; the RO arrays (NF arrays) may each contain the same or a different number and/or arrangement of RO units 33 (NF units 36); the RO units 33 (NF units 36) may each contain therein the same or a different number or arrangement of RO membranes 31' (NF membranes 32'.) FIG. 3 depicts an RO/NF array 30A comprising a first RO array 31A1, a second RO array 31A2, and an NF array 32A. With reference back to FIG. 1, each RO array 31A1 and 31A2 contains therein a plurality of RO vessels or units 33, and each RO unit or vessel 33 contains therein a plurality of RO elements or filters 31'; NF array 32A contains therein a plurality of NF vessels or units 36, and each NF vessel or unit 36 contains therein a plurality of NF elements or filters 32'.

The UF units 22 and membranes 22' may be any known to those of skill in the art. In one or more embodiments, the UF units or membranes comprise dead-end membranes as described in International Patent Application No. PCT/EP2017/067443 published as WO/2018/015223, the disclosure of which is hereby incorporated herein in its entirety for purposes not contrary to this disclosure. Within the UF skids, particulates are removed from a feed water introduced via UF feed water inlet line(s) 10, to provide a UF permeate water removed from the UF skids via UF outlet line(s) 15. For example, feed water may be introduced into UF skids 20A, 20B, 20C, 20D, 20E, 20F, 20G, 20H via lines 10A, 10B, 10C, 10D, 10E, 10F, 10G, 10H, respectively, and ultra-filtered water removed from UF skids 20A, 20B, 20C, 20D, 20E, 20F, 20G, 20H via UF outlet lines 15A, 15B, 15C, 15D, 15E, 15F, 15G, 15H, respectively. The UF water in UF outlet lines 15A, 15B, 15C, 15D, 15E, 15F, 15G, 15H may be combined to provide UF water in UF line 15. The feed water in feed water line(s) 10 may comprise sea water (SW), brackish water, aquifer water, PW, or a combination thereof, and may be introduced to the UF skid(s) via one or more high pressure pump(s) (e.g., sea water lift pumps), heat exchangers, and the like. For example, as shown in the embodiment of FIG. 2, a portion 5A of the feed water from feed water feed pumps and coarse filter(s) in line 5 can pass through heat exchanger 6 prior to introduction into UF skids via line(s) 10. A line 5B may be utilized to bypass heat exchanger 6. The UF water may be stored in a buffer tank 23 prior to introduction to downstream RO/NF section 30 via UF line 15.

The RO/NF units 33 and membranes 31' may be any known to those of skill in the art. In one or more embodiments, the RO/NF units or membranes are cross-flow membranes, which may comprise one flow inlet and two outlets, in one or more embodiments. The RO/NF skids of the RO/NF section 30 are configured to reduce the salinity and/or hardness of the water introduced thereto via line 15 and provide a reduced salinity or softened water in line 25. For example, as shown in the embodiment of FIG. 1, UF permeate water in UF permeate line 15 can be introduced into RO/NF skids 30A, 30B, and 30C via RO/NF feed lines 16A, 16B, and 16C, respectively. As shown in more detail in the embodiment of FIG. 3, each RO/NF skid, such as RO/NF skid 30A, may be operable to produce an RO permeate water in line 38A and/or an NF permeate water in line 38A'. In one or more embodiments, the RO and NF waters may be combined to provide an RO/NF water having a desired salinity and/or TDS content.

As shown in the embodiment of FIG. 3, UF water may be introduced into first RO array 31A1 via RO/NF feed line 16A and pump P1, and the concentrate from first RO array 31A1 may be removed from first RO array 31A1 via first RO array concentrate outlet line 34A1. A first portion 34A1' of the first RO array concentrate may be utilized as feed for second RO array 31A2, and the remainder 34A1" of the first RO array concentrate utilized as feed for the NF array 32A. RO permeate removed from first RO array 31A1 via first RO array permeate line 35A1 may be combined with permeate from second RO array 31A2 in second RO array permeate line 35A2. Concentrate from second RO array 31A2 may be removed from second RO array 31A2 via second RO array concentrate line 34A2, and a portion sent for disposal (e.g., sea water dumping) via line 39A, a portion recycled via line 34A2', or both. A portion of the NF permeate removed from NF array 32A via NF permeate line 35A can be combined via NF permeate water line 38A' with RO permeate water in RO permeate line 38A, disposed of (e.g., dumped to sea) via line 39B, or a combination thereof. A portion of the RO/NF water in line 25A can be utilized for low salinity or softened water EOR via line 25A', a portion sent for disposal (e.g., via dumping to sea) via line 39C, or a combination thereof.

The NF array(s) may provide NF water having a higher salinity or TDS than the RO water. For example, the RO permeate water in line 38A may have a salinity or total dissolved solids (TDS) content of less than or equal to about 300, 250, 200 ppm, or in the range of from about 10 to about 8,000 from about 20 to about 5,000, or from about 50 to about 4,000 ppm. The NF permeate water in line 38A' may have a salinity or total dissolved solids (TDS) content of less than or equal to about 30,000, 25,000, or 20,000 ppm, or in the range of from about 10,000 to about 80,000, from about 15,000 to about 70,000, or from about 20,000 to about 60,000 ppm. Blending of the RO water in line 38A and the NF water in line 38A' may be utilized to provide an RO/NF water in line 25A having a desired salinity or TDS. For example, the RO/NF section 30 may provide an RO/NF water in line 25 (or in a stream further comprising PW water) having a target salinity or total dissolved solids (TDS) for injection into a reservoir during EOR. The target salinity for the low salinity or softened EOR water may be less than or equal to about 10,000, 7,500, or 5,000, or in the range of from 200 to 10,000, from 500 to 5,000, or from 1,000 to 5,000 ppm. A threshold salinity or TDS, which can be a salinity or TDS higher than the target salinity or TDS, may be a maximum salinity or TDS at which an EOR effect of low salinity or softened water is still expected to occur. In one or more embodiments, the threshold salinity or TDS is less than or equal to about 10,000, 8,000, 7,500, or 5,000 ppm.

A system of this disclosure can comprise any number of UF, RO, and/or NF units arranged in any number or arrangement of, for example, rows, banks, stages, arrays, or skids. In one or more embodiments, the system comprises three RO/NF skids, each comprising horizontally arranged rows of RO units and a number of NF units. These units may be arranged in two banks of horizontal rows (first and second banks) on either side of vertical feed, retentate, and permeate headers. In one or more embodiments, each bank of a skid may be valved separately so that the banks are individually isolable, allowing each bank of a skid to be flushed and cleaned separately. Without limitation, this may provide the following advantages: (a) reducing the size of the cleaning tank of the CIP skid (discussed further hereinbelow) while maintaining a cross-flow cleaning velocity; (b) reducing the size of the pumps for circulating the cleaning fluid; (c) allowing one bank of an RO/NF skid to be in operation while the other bank is offline for cleaning. In other embodiments, the RO/NF skid comprises three or more banks that are each independently isolable. Numerous other arrangements of UF, RO, and NF units, discussed briefly below, are possible and such arrangements are within the scope of this disclosure.

As detailed in FIG. 3, each bank of an RO/NF skid can be a multistage array comprising a first RO array 31A1, a second RO array 31A2 and an NF array 32A. The first and second RO arrays 31A1 and 31A2 are arranged in series with the retentate from the first RO array 31A1 used as feed to the second RO array 31A2. The first RO array 31A1 is also arranged in series with the NF array 32A, with a portion of the retentate from the first RO array 31A1 used as feed to the NF array 32A. In addition to being able to have one bank of an RO/NF skid in production and the other bank isolated for cleaning, the arrays of each bank may be separately isolated allowing each array to be cleaned and flushed separately. As discussed in more detail below, this may allow the cleaning chemistry to be targeted at the particular foulant present on the membranes of each array. In one or more embodiments, the first RO array 31A1 of an RO/NF skid may be cleaned separately from the second RO array 31A2 and NF array 32A. The second RO array 31A2 and the NF array 32A of the bank may be cleaned simultaneously if they tend to have the same foulants. However, in one or more embodiments, the NF array 32A may be cleaned separately from the second RO array 31A2. Valving the NF array 32A separately from the second RO array 31A2 can allow the NF array 32A of the bank to be taken off-line later in the life of a low salinity or softened water waterflood when blending of the RO permeate 38A with NF permeate 38A' may be replaced by blending of the RO permeate 38A with produced water (PW).

In one or more embodiments, the RO and NF membrane elements 31' and 32', respectively, of each RO unit 33 and NF unit 36, respectively, are spiral wound and, during filtration are operated in cross-flow mode such that there is a feed inlet, a retentate (concentrate) outlet on the feed side of the membrane and a permeate outlet on the permeate side of the membrane.

The first RO array (e.g., first RO array 31A1) of each RO/NF skid (e.g., RO/NF skid 30A) may comprise a number of parallel RO units 33 (e.g., 48 parallel RO units, with 24 in a first bank and 24 in a second bank). In one or more embodiments, the RO units 33 are arranged in horizontal rows on either side of vertical headers. Similarly, a second RO array of an RO/NF skid (e.g., second RO array 31A2 of RO/NF skid 30A) may comprise a number of parallel RO units 33 (e.g., 36 units in a second RO array 31A2 of RO/NF skid 30A) and a number of NF units 36 (e.g., 4 NF units in the NF array 32A of RO/NF skid 30A). The RO units 33 of a second RO array (e.g., second RO array 31A2) and the NF units 36 of an NF array (e.g., NF array 32A) may be operated in parallel. Half of the RO units of a second RO array (e.g., second RO array 31A2) of an RO/NF skid may be arranged in the first bank and half in the second bank. The NF units may be arranged together in one or more rows of each bank. In one or more embodiments, three RO units (or NF units) comprise a row of a bank. In one or more embodiments, the NF units are arranged together in a row.

For each bank of an RO/NF skid, the RO units 33 of a first RO array (e.g., first RO array 31A1) may be cleaned separately from the RO units 33 of a second RO array (e.g., second RO array 31A2) and the NF units 36 of an NF array (e.g., NF array 32A). This may be desirable, for example, when the RO units of the first RO array experience different foulants to the RO units of the second RO array and the NF units of the NF array, as discussed in more detail hereinbelow.

The RO units and NF units of each row of a bank may or may not be fed individually. In one or more embodiments, the pressure vessels of the RO units (or NF units) of a row are interconnected on a feed side with feed water passing into a first unit and from the first to the second and then the third units or more of the row. It may or may not thus be possible, in one or more embodiments, to isolate the vessels individually. Similarly, it may or may not be possible to isolate individual RO elements or NF elements in an RO unit or NF unit for cleaning. However, in the case of center-ported pressure vessels, additional valving may be utilized to allow the membrane elements on each side of the center ports to be cleaned separately. This may provide the advantage of further reducing the size of the cleaning tanks and pumps, but at the expense of an increased weight and footprint of each RO/NF skid. In one or more embodiments, 2 or 3 RO elements are arranged in series on either side of the center ports, as described in European Patent Application No. 17163422.3, the disclosure of which is hereby incorporated herein by reference in its entirety for purposes not contrary to this disclosure.

As noted above, different arrangements of UF, RO, and NF units are possible and such arrangements are within the scope of this disclosure. In one or more embodiments, an arrangement of RO and NF units in the RO/NF skids is different from that depicted in the embodiment of FIG. 3. For example, the RO units can be arranged in parallel in a single stage. For example, in one or more embodiments, there can be a single RO array with seawater or UF water used as feed to the RO units of the array (a single pass system). Similarly, in one or more embodiments, the NF units can be arranged in parallel in a single stage with seawater or UF water used as feed to the NF units of the array (a single pass system). The NF units and RO units can be arranged in the same skid as indicated in the embodiments of FIGS. 1 and 3 (typically with many more RO units than NF units), in which one or more embodiments, each bank or array of the skid can comprise both RO units and NF units. Alternatively, there could be one or more skids comprising RO units and a separate skid(s) comprising NF units. In any arrangement, each skid can comprise at least two banks or arrays of units, thus allowing individual banks or arrays to be cleaned separately.

In other embodiments, a system comprises a first NF array with the retentate from this array used as feed to a second NF array. A third NF array may further be present, with the retentate from the second NF array used as feed to the third NF array. In this embodiment, the first NF array may be susceptible to a particular contaminant (e.g., biofouling) and the second and/or third NF arrays more susceptible to another contaminant (e.g., mineral scale) due to the increased TDS, salinity, or ionic strength of the feed thereto.

In one or more embodiments in which the RO elements are arranged in a separate skid, the retentate from the first RO array can be used as feed to the second RO array (similarly to the arrangement of the RO arrays in the embodiment of FIG. 3). As discussed above, in such embodiments, the first RO array may be susceptible to one contaminant (e.g., biofouling) and the second RO array more susceptible to another contaminant (e.g., scaling) owing to the increased TDS of the feed (i.e., the retentate from the first RO array), and the herein-disclosed predictive method, system and tool utilized to determine, schedule, and/or initiate or perform a cleaning suitable to the particular foulant encountered.

Predictive system I can further comprise one or more clean-in-place (CIP) skids 70. The CIP skid may be operable for chemical cleaning of RO and NF units. The CIP skid 70 may also be used for chemical cleaning (e.g., not flushing or backwashing in some instances) of the UF (ultrafiltration) units of the UF skid(s). As indicated via line 75, the CIPs 70 may be fluidly connected with one or more UF, RO, or NF units of the desalination or water softening system during cleaning. CIP skid(s) 70 may comprise one or more cleaning tanks and associated tanks for storing concentrated solutions of a plurality of cleaning chemicals. As discussed in more detail hereinbelow, there may be a limited number of CIP skids 70 (e.g., on a platform), and scheduling of CIPs according to embodiments of this disclosure can take into account a number of available CIPs. For example, a single CIP skid 70 may be available to clean the RO arrays, the NF arrays and the UF skids, for on an offshore desalination plant or SRP plant. CIP cleaning can take substantial time, as it may involve draining the CIP tank to remove a previous chemical (if the chemical solution in the CIP tank is not required for the selected cleaning routine), filling the CIP tank with permeate (e.g., RO and/or NF permeate), adding an appropriate chemical from a concentrate tank, and performing cleaning cycles and soak periods, re-draining the tank, if necessary, and repeating the sequence with another chemical solution. Once a suspected foulant is determined and a suitable cleaning program is initiated (e.g., initiated manually via human intervention or automatically via controller 60, as described hereinbelow) the cleaning cycles provided by the CIP(s) may be automated. Suitable cleaning routines (chemicals, cleaning and holding times, pressures, etc.) for various foulants and suitable for use with various membranes are known and provided by manufacturers of the membranes, and will not be detailed herein.

Predictive system I further comprises one or more UF sensors 40 configured to provide data regarding the one or more UF skids. The one or more UF sensors may be configured to provide, for example, one or more measurement selected from inlet temperature, inlet pressure, outlet pressure, flow rate, or a combination thereof for each of the one or more UF skids. As indicated in the embodiment of FIG. 2, an ultrafiltration section 20 may comprise sensors 40A, 40B, 40C, and 40D. Sensors 40A-40D may be selected from flow rate sensors, temperature sensors, pressure sensors, composition sensors, or a combination thereof. For example, in one or more embodiments such as that indicated in FIG. 2, sensor(s) 40A may be temperature sensors positioned on UF feed water inlet line 10, and configured to measure the temperature of the feed water; sensors 40B and 40C may be pressure sensors operable to measure the inlet pressure of the feed water and the outlet pressure of the filtrate, respectively, for each skid 20A-20H; sensor(s) 40D may be flow rate sensors operable to measure the flow rate of the UF feed water inlet lines for each UF skid 20A-20H. Various valves may be present to control flow in response to measured parameters or inputs from UF sensors 40. For example valve V1 may be operable to provide recycle or bypass around heat exchanger 6 to adjust the temperature in feed water inlet line 10 in response to a measurement from temperature sensor 40A; a valve V2 may be operable to control the feed flow to each UF skid 20A-20H in response to a measurement from flow rate sensor 40D, pressure sensors 40B/40C, or a combination thereof. Other sensors, valves, and locations thereof may be utilized.

Predictive system I further comprises one or more RO/NF sensors 50 configured to provide data regarding the one or more RO/NF arrays. The one or more RO/NF sensors 50 may be configured to provide, for example, one or more measurement selected from inlet temperature, feed pressure, outlet pressure, feed flow rate, permeate flow rate, total dissolved solids (TDS) in the permeate stream, or a combination thereof for each of the one or more RO/NF arrays. For example, in one or more embodiments such as that indicated in FIG. 3, sensor(s) 50A, 50B, and 50C may be pressure sensors operable to measure the inlet pressure of the feed water and the outlet pressure for each skid or array; sensor(s) 50D may be flow rate sensors operable to measure the flow rate of the water inlet lines (e.g., RO/NF feed line 16A) for one or more RO or NF array; sensor(s) 50E may be composition sensor(s) operable to determine the salinity or TDS in the permeate from an array (e.g., in the first RO permeate in first RO permeate line 35A1, in the second RO permeate in second RO permeate line 35A2, in the NF permeate in NF permeate line 35A, or a combination thereof) or in the blended RO/NF stream in blended RO/NF line 25A; sensor(s) 50F may be flow rate sensors operable to measure the flow rate of concentrate from one or more arrays (e.g., in the second RO array concentrate in line 34A2). Various valves may be present to control flow in response to measured parameters or inputs from RO/NF sensors 50. For example valves V4A/V4B may be operable to control the flow rate in RO/NF feed line 16A in response to a measurement from flow rate sensor 50A; a valve(s) V5/V6 may be operable to control the flow rate in second RO concentrate line 34A2 and/or dump line 39A in response to a measurement from flow rate sensor 50F; valve V7 may be operable to control the flow rate (and thus adjust the blending of NF with RO water) in second NF permeate line 38A' and NF permeate dump line 37 in response to a measurement from composition sensor 50E; valves V8/V9 may be operable to control the flow rate in blended water dump line 39C in response to a measurement from pressure sensor 50F; or a combination thereof. Other sensors, valves, and locations thereof may be utilized.

The UF sensors 40 and RO/NF sensors 50 may be any known to those of skill in the art. Sensors to determine the TDS and/or ionic composition of various streams, such as the blended low salinity injection water stream(s), the RO permeate stream, the NF permeate stream, may determine TDS from the conductivity, while the concentrations of individual ions or types of individual ions may be determined using glass probes having membranes that are permeable to specific individual ions or types of individual ions. In addition to using chemical UF and/or RO/NF sensors, samples of the waters may be sent to a laboratory for analysis of their compositions, which may be inputted into the controller 60 (described hereinbelow), in one or more embodiments.

Predictive system I further comprises a controller 60 comprising a processor 65 in signal communication (indicated by dotted lines in FIG. 1) with the one or more UF sensors 40, the one or more RO/NF sensors 50, or a combination thereof. Controller 60 includes a processor or CPU (central processing unit) 65, a memory 66 (e.g., RAM (random access memory), a ROM (read only memory)), a HDD (hard disk drive), I/F (interfaces) such as display 61 and network interface 62, and the like, and can be implemented by executing a software including the herein-disclosed performance monitoring tool stored in the ROM by the CPU. The software can configure the processor 65 (when executed upon the processor) to perform any of the steps and methods described herein.

Figure 4:
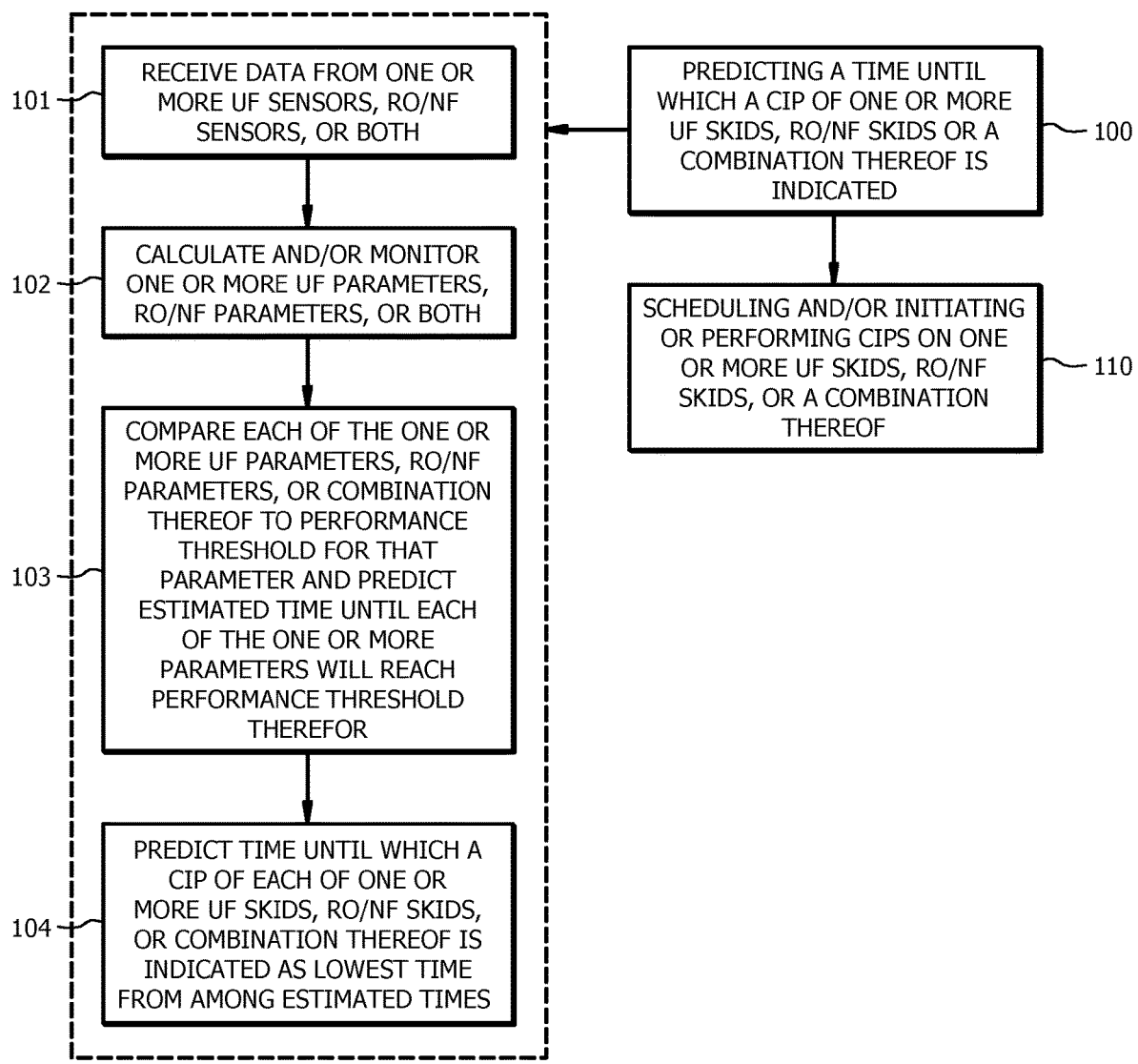
FIG. 4 is a block diagram of a method II for monitoring fouling of membranes of a desalination or water softening plant comprising ultrafiltration (UF) membranes, reverse osmosis (RO) membranes, nanofiltration (NF) membranes, or a combination thereof, according to an embodiment of this disclosure.

Controller 60 may be configured to receive and utilize the data from the one or more UF sensors 40, the one or more RO/NF sensors 50, or a combination thereof, as will now be described further with reference to a left portion of FIG. 4, which is a block diagram of a method II for monitoring fouling of membranes of a desalination or water softening plant comprising UF membranes, reverse osmosis RO membranes, NF membranes, or a combination thereof, according to an embodiment of this disclosure. As indicated in the embodiment of FIG. 4, controller 60 may be configured to receive data from one or more of the UF sensors 40, the RO/NF sensors 50, or both, as indicated at box 101. Controller 60 may be further configured to calculate and/or monitor, utilizing the data from one or more of the UF sensors 40, for each of the one or more UF skids, one or more UF parameters and compare each of the one or more UF parameters to a performance threshold, wherein the performance threshold indicates a time at which a cleaning in place (CIP) of the UF skid is to be performed, and predict an estimated time until which the one or more parameters of a UF skid will reach the performance threshold, calculate and/or monitor, utilizing the data from one or more of the RO/NF sensors, one or more RO/NF parameters and compare each of the one or more RO/NF parameters to a performance threshold, wherein the performance threshold indicates a time at which a cleaning in place (CIP) of the RO/NF skid is to be performed, and predict an estimated time until which the one or more parameters of an RO/NF skid will reach the performance threshold; or a combination thereof, as indicated at box 102. The performance thresholds may be those set by the membrane manufacturers (e.g. minimum and maximum feed, transmembrane, and/or differential pressure), and can be inputted as boundary values for the controller 60.

In one or more embodiments, a rate of fouling based on each of the one or more parameters is calculated based on an average change in that parameter over a rate of fouling time period, and the estimated time until a skid will reach a performance threshold for that parameter is predicted by dividing a difference between the current value of that parameter and a threshold value for that parameter by the average change in that parameter over the rate of fouling time period. For example, in one or more embodiments, the rate of fouling comprises a differential pressure (DP) rate of fouling calculated based on an average increase in normalized DP over a rate of fouling time period, and the estimated time until a DP performance threshold is reached is predicted by dividing a difference between the current DP and a threshold DP by the average DP rate of fouling. For example, the rate of change of transmembrane pressure can be monitored and a prediction of when the maximum permitted increase in transmembrane pressure will occur provided by predicting the trend forward in time. Predictive aspects of the herein-disclosed method, system, and tool can be utilized to highlight or capture an increase in a rate of fouling of the UF, RO, and/or NF membranes and facilitate or automate diagnosis of when an array or bank of a skid is taken offline for cleaning, which may, in one or more embodiments, enable optimization of the cleaning of a skid (or another grouping of units, such as a row, bank, or array thereof).

By way of example, the one or more UF parameters are, in one or more embodiments, selected from: a normalized feed flow rate, a normalized transmembrane pressure (TMP), a highest normalized TMP in a TMP reference time period, a skid flux, a specific skid flux calculated as the flow rate per surface area divided by the TMP, a temperature corrected specific flux (TCSF), a lowest specific flux in a lowest flux reference time period, a backwash (BW) frequency, a CEB frequency, a TMP increase after a routinely scheduled chemically enhanced backwash (CEB), a number of CIPs (cleans-in-place) in a CIP reference time period, a volume of liquid introduced into a UF skid during a BW or CEB, a BW duration, a pressure decay rate (PDR), a pressurization rate, or a combination thereof. In specific embodiments, the one or more UF parameters comprise the lowest specific flux, the volume of liquid introduced into a UF skid during a BW or CEB, the BW frequency, or a combination thereof.

In one or more embodiments, noted above, the one or more UF parameters comprises a UF skid flux, a specific skid flux calculated as the flow rate per surface area divided by the TMP, a temperature corrected specific flux (TCSF), a lowest specific flux in a lowest flux reference time period, or a combination thereof. Specific flux or permeability is a measure of throughput (per surface area) divided by TMP. This parameter will exhibit an inverse of the TMP trend, and, by taking into account changes in TMP and flow rate, specific flux may provide a better representation of UF performance. For example, a decrease in specific flux can indicate membrane fouling and an increase in flux can indicate membrane damage (or skid BW, CEB, or CIP).

Specific flux or permeability will vary with temperature, and therefore, temperature corrected specific flux (TCSF) may be monitored, in one or more embodiments, to take into account variations in temperature. Monitoring TCSF can help ensure that the maximum TMP is not exceeded during a backwash. If the backwash operates at a TMP higher than this maximum limit, there is a risk that fibers will collapse and split. A significant increase in flux can result in excessive solid loading which can accelerate fouling. The membrane manufacturer may provide a maximum or threshold flux rate not to exceed.

In one or more embodiments, the one or more UF parameters comprise a volume of liquid introduced into a UF skid during a BW or CEB, for example via a valve V3, or a BW duration. In one or more embodiments, a BW totalizer can be provided that resets to zero after each BW or CEB, and a trend may be provided for this totalizer. A BW or CEB is generally performed for a specific period of time and utilizing a specific volume of liquid. A deviation from this expected time or amount of liquid can indicate an ineffective cleaning or an overcleaning. In one or more embodiments, the one or more UF parameters comprise a backwash (BW) or chemically enhanced backwash (CEB) frequency. A BW or CEB may be initiated regularly (e.g., every forty minutes), or when a threshold pressure is exceeded. In one or more embodiments, the number of BWs or CEBs per day may be monitored, and a number exceeding a threshold for the number of BWs or CEBs per day may be utilized to predict a need for a UF CIP.

By way of example, the one or more RO/NF parameters are, in one or more embodiments, selected from: a normalized feed pressure for each of the one or more RO/NF arrays, a normalized feed flow rate for each of the one or more RO/NF arrays, a normalized differential pressure (DP) for each of the one or more RO/NF arrays, a net driving pressure (NDP, which equals the feed pressure minus an osmotic pressure and a permeate back pressure) for each of the one or more RO/NF arrays, a recovery ratio equal to the permeate flow rate divided by the feed flow rate for each of the one or more RO/NF arrays, an average TDS in the permeate from each of the one or more RO/NF arrays, a normalized salt passage (SP) for each of the one or more RO/NF arrays, a normalized permeate flow rate for each of the one or more RO/NF arrays, a rate of fouling for each of the one or more RO/NF arrays, a CIP cleaning frequency for each of the RO/NF skids, a TDS skid discrepancy which is the difference of an outlet TDS of an RO/NF skid from the calculated average outlet TDS of associated combination of RO/NF arrays, or a combination thereof. In specific embodiments, the one or more RO/NF parameters are selected from the rate of fouling, the CIP cleaning frequency, the TDS skid discrepancy, or a combination thereof.

In one or more embodiments, the one or more RO/NF parameters comprise a rate of fouling (ROF). The rate of fouling may be calculated based on an average increase in a parameter (e.g., DP) over a time period (e.g., 24 hours). If the ROF exceeds an expected value, a CIP may be needed sooner than regularly scheduled. The ROF may be utilized to predict when a CIP may be needed, and an alert may be utilized to display the estimated days until a CIP cleaning is required. In one or more embodiments, the one or more RO/NF parameters comprise a TDS skid discrepancy. For example, an overall skid TDS of greater than a certain amount (e.g., ±10%) may indicate a leak from the NF concentrate (or reject stream) 34A to the NF permeate stream 35A, which could result in high sulfate concentration in the blended RO/NF stream 25. An alert may be utilized to indicate when a TDS skid discrepancy is greater than a certain threshold amount (e.g., ±5%).

The lowest specific flux reference time period may be any suitable time period, for example, 24 hours. The TMP reference time period may be any suitable time period, for example, 24 hours. A routinely scheduled CEB can be, for example, a daily CEB. The CIP reference time period can be any suitable time period, for example, three months. The CEB frequency can comprise the number of CEBs in a reference time period, for example, 7 days. The CIP cleaning frequency for each of the RO/NF skids can comprise the number of CIP cleans per a reference time period, for example, a year. The BW frequency can comprise the number of BWs in a reference time period, for example, over a 24-hour period.

The normalized feed flow rate may be normalized against a reference temperature and/or net driving pressure, the normalized feed pressure may be the feed pressure normalized against a reference flow rate, the normalized SP may be the SP normalized to a reference flow rate and reference temperature, the normalized TMP may be the TMP normalized against a reference flow rate, the normalized DP may be the DP normalized against a reference temperature and reference flow rate, the normalized permeate flow rate may be the permeate flow rate normalized against reference temperature and reference NDP, or a combination thereof. The reference temperature, the reference flow rate, the reference net driving pressure, or a combination thereof can be those values on a reference date and time, for example, on the first day of operation (e.g., when commissioned for the first time or following membrane replacement).

An alert system may be combined with the performance monitoring. In one or more embodiments, controller 60 can further comprise a display 61, a network interface 62, or both. Processor 65 may produce an output or alert comprising a display on display 61 for at least one of the one or more UF parameters, the one or more RO/NF parameters, or a combination thereof, an email alert sent via the network interface 62 and a network or cloud 63 indicating that at least one of the one or more UF parameters, the one or more RO/NF parameters, or a combination thereof has or soon will reach or exceed an alert level, or both. A display or other alert (e.g., an email) may also be utilized to indicate if a cleaning (e.g., a BW, CEB, or CIP of UF membranes or a CIP of RO/NF membranes) was or was not effective, or a predicted/suggested time until membrane replacement.

The alert may indicate the current status or alert level of the parameter and/or may indicate the prior status or alert level of the parameter. In some embodiments, a numerical display may be used to provide the value of a parameter or a numerical alert level indicator therefor. The alert may provide an indication of the monitored condition and when the monitored condition is approaching or at a fault condition. The alert can also indicate that a calculation failed, for example, with respect to the timing of a clean. Numerous other displays and alerts are possible and within the scope of this disclosure.

Automated alerts for the one or more parameters may thus be displayed on display 61 (which may be a computer screen), disseminated via email utilizing network interface 62 and network or cloud 63 to responsible parties, or both. In one or more embodiments, a first level of alert is handled by controller 60 by a change in a display, while a higher alert level is handled by another change in a display, an email, or both. In one or more embodiments, alerts may be displayed on a screen next to a graphical display of a monitored trend associated therewith. In one or more embodiments, discussed further hereinbelow, a suggested or automated response to an alert can also be displayed (e.g., on the same or another screen) and/or emailed. As noted above, a display or alert may be utilized to indicate a predicted time until a CIP cleaning.

Controller 60 may provide a continuous display of the displayed parameter, in one or more embodiments, or may provide an update at varying frequency, e.g., daily, weekly, bi-weekly, monthly, etc. The monitoring at box 102 for the desalination or water softening plant may comprise many alerts with different screens or displays for different levels of the system. For example, the monitoring of the performance of the membranes at box 102 may be outputted by controller 60 via displays including a screen for all of the UF skids 20A/20B/20C/etc.; a screen for each UF skid (e.g., a screen or display for UF skid 20A, a screen or display for UF skid 20B, a screen or display for UF skid 20C, etc.); a screen for each bank of a UF skid 20A/20B/20C/etc.; a screen including monitored parameters for all of the RO/NF skids 30A/30B/30C/etc.; a screen for each RO/NF skid (e.g., a screen or display for RO/NF skid 30A, a screen or display for RO/NF skid 30B, a screen or display for RO/NF skid 30C; etc.); a screen or display for each array of a skid (e.g., a screen or display for a first RO array, a screen or display for a second RO array and a screen or display for an NF array, or any other arrangement of arrays). As noted above, alerts can be displayed on the aforementioned screens. Alternatively, email alerts may be sent, for example to a process engineer.

The herein disclosed method, system, and tool can be utilized to monitor and highlight via display trends relating to membrane damage and membrane fouling within skids and arrays. The trends monitored by the tool can be used by the process engineer to select the cleaning protocols for the UF skids (frequency of backwashes and frequency of cleans with cleaning chemicals (e.g., chemically enhanced backwashes or CEBs) and/or CIPs) and the cleaning protocols (routines) for the RO and NF array (e.g., CIPs), or such responses/protocols may be automated, for example by controller 60. In one or more embodiments, the method, system, and tool can also determine the effectiveness of a cleaning.

As noted above, alerts may be provided for one or more UF parameters, one or more RO/NF parameters, or a combination thereof, or a trend thereof. By way of specific examples, one or more of the alerts noted below may be provided, in one or more embodiments.

The increase in transmembrane pressure over time (e.g., across a bank of UF units). For example, an alert may be provided for a deviation from a predicted transmembrane pressure profile or an increase in transmembrane pressure that exceeds a threshold value. As noted above, for RO and NF arrays, the ΔP can be normalized with respect to temperature.

The increase in feed pressure to a bank of UF units or to an RO or NF array. For example, an alert may be provided for a deviation from a predicted feed pressure profile or a feed pressure that exceeds a threshold pressure. The threshold pressure may be dictated, for example, by a feed pump or the manufacturer's maximum permitted operating pressure for a membrane element.

An alert for an unacceptable reduction in normalized permeate flow rate for the RO and/or NF permeate. As noted above, these permeate rates can be normalized with respect to temperature and/or net driving pressure.

An alert for percent recovery of RO and/or NF permeate, which may be determined as ([(the volume of the combined permeate stream/the volume of the feed water)×100] over a set period of time). For example, an alert may be provided if the percent recovery begins to deviate from a predicted profile or if a minimum threshold percent recovery is neared (e.g., within 10%) or reached.

An alert for the salt passage (SP) through an NF and/or RO array. For example, an alert may be provided if an upper threshold for total dissolved solids content and/or for concentration(s) of individual ion(s), such as, without limitation, sulfate and divalent cations, is reached or if the salt passage begins to deviate from a predicted trend.

An alert for the production capacity of the plant over time. For example, the production capacity could decrease at a particular point in time for planned maintenance work (for an NF array, RO array and/or UF bank) such that if a further array or bank were to be taken out of production for cleaning over that time period, the minimum required production capacity would not be achieved. In such embodiments, the system could provide a different display or indicator. The operator or the system/tool could then select another time period for the cleaning and determine if the minimum production capacity for the plant could be maintained utilizing the newly scheduled time. Desirably, the timing of the cleaning would remain prior to exceeding of a threshold for the maximum feed pressure or maximum increase in transmembrane pressure.

In one or more embodiments, the processor 60 is further operable to monitor a trend in the one or more UF parameters, the one or more RO/NF parameters, or a combination thereof, and compare the monitored trend with data in a memory 66 thereof to produce an output indicating a potential cause of changes in the trend (such as causes of the membrane fouling) and/or to suggest and/or automatically initiate an appropriate response thereto or remedy therefor. Processor 60 may be further configured to provide a suggested schedule for performing CIPs on one or more of the UF skids, one or more of the RO/NF skids, or a combination thereof. The processor 60 may suggest the schedule based on data inputted into a memory thereof regarding an estimated duration for a UF CIP and/or an RO/NF CIP, the availability of one or more CIP skids, a production requirement for water from the desalination or water softening system, the time the processor 65 predicted until which a cleaning of each of the one or more of the UF skids, the one or more of the RO/NF skids, or a combination thereof is indicated, or a combination thereof.

As discussed hereinabove, the alerts relate to adverse or unhealthy conditions. Typically, threshold conditions for the monitored parameters (e.g. a maximum and minimum transmembrane pressure) are inputted into the system or tool with the threshold being indicative of a fault (unhealthy or adverse) condition. In one or more embodiments, the method, system, and tool of this disclosure are operable to perform root cause analyses on the fault condition to determine if the condition is critical or non-critical and to determine (and/or automatically initiate) a strategy or procedure for resolving a critical fault condition, e.g. suggest or initiate cleaning the membranes of an array to restore the transmembrane pressure or replacing of membrane elements. Based on experience, strategies for dealing with the specific fault conditions (root cause analyses) can be determined and inputted into processor 65 (e.g., into memory 66 thereof) to provide effective strategies for dealing with specific fault conditions.

Thus, in one or more embodiments, the methods, systems, and tools of this disclosure can be utilized to predict the timing for cleaning of a membrane array, skid, or bank; a suitable cleaning routine to implement (e.g. for removing microorganisms and bio-slime or for removing mineral scales, etc.); how long to continue cleaning (e.g., about a day); a cleaning frequency (e.g., every several months); if the frequency of cleaning is higher than anticipated; or a combination thereof.

The fouling trends along with trends concerning bottlenecks in the production capacity of low salinity or softened water (e.g., a softened and sulfate reduced, SRP water) and the demand for low salinity or softened water may thus be utilized to predict when to perform and/or schedule a clean, such that it may be possible to intervene at a time when there is a reduced operational impact associated with taking one or more groups of membranes off-line for cleaning.

The trends monitored at 102 may also be utilized, in one or more embodiments, for the selection of an appropriate cleaning routine depending on the type of foulant, for example, whether the foulant is predominately biological or predominantly a mineral scale. For example, as noted hereinabove, the processor 65 may compare a monitored trend with data (for example, in a memory 66 of processor 65) to produce an output via display 61 or network interface 62 indicating a potential cause of the membrane fouling, and/or may automatically initiate a suitable response (e.g., when to clean a bank of a UF skid, an RO/NF array, suitable cleaning routine to utilize, etc.). In other embodiments, a human can use the monitored trend to determine a potential cause of the membrane fouling and initiate the suitable response. The data in the memory 66 or the response guide may indicate which alerts are critical and which are non-critical, along with the appropriate responses to the various alerts. The data and/or response manual can be updated based on plant performance.

Thus, in one or more embodiments, the system may be further automated to provide via output an appropriate response to an alert based on a monitored trend. The display may include, for example, graphs for each array, bank or row of membrane units or modules. By way of non-limiting example, graphs may be utilized to display the change in transmembrane pressure over time. Bacterial and bio-slime build up on a membrane surface may result in different "pressure" profiles than the profiles expected for mineral scaling. For example, if bacteria are growing on the membrane surface a logarithmic increase in the change in transmembrane pressure with time can be observed, while as scales tend to build up more slowly, there may be a simple linear increase in TMP with time. Thus, monitoring the rate of change of transmembrane pressure (or other trends) for the membrane elements of an array or bank may facilitate troubleshooting a source of a trend deviation (e.g., fouling, including biofouling or scaling, membrane damage, etc.) and the selection of an appropriate cleaning routine. For example, if the system predicts (e.g., via a monitored trend comprising a gradual increase in feed pressure and/or salt passage) that there is predominantly mineral scale build-up on the membranes of an RO or NF array, the system could automatically select and provide via output a cleaning routine (inputted in a memory 66 thereof based on manufacturer recommendation, engineer knowledge, etc.) suitable for removing or targeting mineral scale. Alternatively, the system could predict (e.g., via a monitored trend comprising a rapid increase in DP and/or SP) that there is predominantly biological fouling of an RO/NF array, the system could select choose and provide via output a cleaning routine suitable for removing bacteria or other microorganisms, biofilms, and bio-slime.

By way of example, a system comprising two RO arrays, as in the embodiment of FIG. 3, may experience a buildup of different foulants on each of the two RO arrays. For example, the foulants on the RO membranes 31' of the first RO array, such as first RO array 31A1, may comprise colloidal particles (inorganic or organic colloidal particles) and bacteria that may produce a bio-slime. The bacteria (or other microorganisms such as mold) typically exhibit an exponential growth on the membrane surface. These foulants may be removed in a different manner than the foulants on a second RO array, such as second RO array 31A2, and/or an NF array, such as NF array 32A. For example, the foulants on the first RO array may be removed by utilizing a high pH (alkaline) cleaning solution that optionally includes a detergent (surfactant). There may be less risk of scale formation on the RO membranes 31' of a first RO array, such as first RO array 31A1, compared with the membranes 31' of a second RO array, such as second RO array 31A2, as the feed to the first RO array may be seawater (SW) or UF water while the feed to the second RO array and the NF array in such an arrangement may be retentate from the first RO array. This retentate may be concentrated in scale precipitate precursor ions, such as $Ca^{2+}$, $Mg^{2+}$, and $Sr^{2+}$, which may increase the risk of precipitation of sulfate scales or in the case of $Ca^{2+}$, calcium carbonate scale on the membranes 31' of the second RO array. There may also an increased risk of precipitation of silica scales on the membranes 31' of the second RO array. In addition, metal oxides (e.g. iron oxide, manganese oxide and aluminum oxide) in the retentate from the first RO array can precipitate on the surfaces of the membranes 31' of second RO array and NF array. A scale may gradually build up on the membranes 31' of the first RO array. However, the time period between scale treatments may be significantly longer than for the second RO array or the NF array in an arrangement as shown in the embodiment of FIG. 3. As the second RO array 31A2 may have a reduced risk of bacterial foulants because bacterial growth is suppressed in the higher salinity feed water (RO retentate from the first RO array 31A1) compared with UF water, but an increased risk of scale deposition with increasing salinity of the feed water, a different cleaning procedure may be utilized therefor. For example, the cleaning water used for the second RO array 31A2 and/or the NF array 32A may be primarily an acidic solution or chelating agent solution, where the acid or chelating agent removes the precipitated salt. As the NF array (like the second RO array 31A2) is fed by the retentate from first RO array 31A1, the fouling problems may be similar, and the units in each bank that make up the second RO array 31A2 and the NF array 32A may be cleaned simultaneously. However, in one or more embodiments, it is possible to separately isolate the units of the NF array and the NF units/array are cleaned separately from the second RO units/array. Once a suitable cleaning routine is selected, scheduled, and initiated (e.g. initiated by the system/tool and/or human intervention), a control system of the CIP may automatically perform the CIP. By monitoring key performance indicators and trends thereof, such as noted in the aforementioned example, and inputting data regarding the root causes of various trends into the memory 66 of processor 65, the system may be automated to provide and/or initiate a suggested response strategy in view of the monitored trend(s). As noted above, parameters other than the TMP utilized in this example can be monitored and utilized by the system/tool or engineer to determine a suitable cleaning response to a monitored trend. For example, as detailed hereinabove, the one or more parameters measured by the UF and/or RO/NF sensors may include a change in flow rate of one of the streams (e.g. of permeate), a change in quality of the RO permeate or NF permeate (e.g., total dissolved solids content and/or concentration of one or more specific ions or types of ions in these streams, etc.).

Thus, in one or more embodiments, the herein-disclosed method, system, and tool are automated to compare monitored trends of the one or more parameters with data in memory 66 of processor 65 coding changes in various parameters that indicate various membrane symptoms i.e. microorganism/biological fouling or mineral scaling. Alternatively or additionally, the method, system or tool monitors trends of the one or more parameters and provides trends and alerts visually on a display and/or via email alerts, as described hereinabove, and human intervention is employed to determine and initiate an appropriate response.

As noted above, the system may be automated to predict forward in time to determine the optimal timing for cleaning an RO or NF array of a skid, based on the monitored trends and prior actions (e.g., number or frequency of cleans), for example, based on the rate of build-up of foulant (as evidenced by the rate of increase in transmembrane pressure or the rate of increase of the feed pressure), bottlenecks in the supply of the RO or NF permeate (e.g., another array is off-line for cleaning or maintenance), and/or variability in the required injection rate for the low salinity or sulfate-reduced, softened injection water.

Although referred to with respect to membrane fouling, other faults that are specific to membranes include catastrophic physical damage to a membrane such as a tear arising from a sudden increase in feed pressure, hydrolysis due to a high or low pH, oxidation damage (e.g., due to chlorine), or an inadequate cleaning program. This could result in a drop in DP and a concentration spike in the permeate from an RO or NF array containing the damaged membrane element(s). The concentration spike occurs as some of the high salinity feed by-passes the membrane through the tear. This may result in an unexpected increase in salt passage (an increase in the concentration of salts in the permeate produced by an NF or RO array). As noted above, an increase in salt passage may be detected at each array using chemical sensors. In this case, the alert or fault condition could comprise exceeding a threshold for the TDS, sulfate concentration, divalent cation concentration, etc. of an RO or NF permeate stream. In such instances, the system/tool could suggest or initiate resolution of this fault condition by automating individual isolation of each bank of an NF or RO array to determine if the damaged membrane element(s) is in only one bank of a skid or, where the bank contains groups of pressure vessels with common supply lines, retentate lines, permeate lines and valving, by isolating individual groups of vessels in each bank (e.g. a horizontal row of a bank) to determine which groups of pressure vessels contain damaged membrane elements. The system could then instruct isolation of these pressure vessels and/or provide an instruction to isolate and replace the membrane elements.

In the case of physical damage to the membrane elements of a UF skid (e.g. tearing or abrasion leading to feed water bypassing the membranes), an alert could be output in response to a spike in the suspended solids content of the UF filtrate which could lead to damage to the membrane elements of the RO/NF arrays of the RO/NF skids that are located downstream of the UF skids. An increase in suspended solids content could be monitored by having a screen in the UF filtrate line(s) 15 having a mesh size that retains suspended particles that by-pass the UF membranes and by using a UF sensor 40 to monitor the pressure across the screen. Alternatively, it might be possible to utilize a UF sensor 40 to monitor turbidity of samples of the UF filtrate either online in real time or offline. As with the RO/NF arrays discussed above, the method, system, and tool of this disclosure may be operable to perform an automatic fault analysis to determine where the damaged membrane elements are in the UF skid (by isolating a bank of the skid or groups of pressure vessels (e.g. rows of a skid) with common supply lines, filtrate lines and valving). The system could then output an alert and/or instruction to replace the damaged UF elements, and/or initiate membrane replacement.

In addition to membrane fouling and catastrophic physical damage to a membrane, the herein-disclosed method, system, and tool can, in one or more embodiments, be automated to predict when RO/NF membranes should be replaced because of ageing (chemical and physical degradation of the membrane structure over time). For both UF membranes and RO/NF membranes there are pressure profiles (e.g., TMP profiles for the UF membranes, and DP profiles for the RO/NF membranes) that are indicative of damage (premature aging). In one or more embodiments, the herein-disclosed method, system, and tool provide for extending or maximizing the intervals between CIPs in the light of monitored trends and root cause analyses, which may enable a reduction in the deterioration of the membranes arising from the cleaning chemicals damaging the membrane during a CIP.

In one or more embodiments, the herein-disclosed method, system, and tool are automated to provide a regular (e.g., daily, weekly, bi-weekly, monthly, or quarterly) advisory of planned down-time for the UF skids, and/or RO and/or NF arrays, predicting forward in time to estimate when a bank of a UF skid or an RO or NF array will need to be cleaned. In one or more embodiments, the automated method, system, and tool can schedule a time for the cleaning of a bank of a UF skid, or an RO array or an NF array of an RO/NF skid. In addition to the present condition of the skid or array (i.e., the one or more parameters thereof), the scheduling may also take into account whether other UF banks or skids or RO and/or NF arrays are also offline for maintenance or cleaning.

Also disclosed herein is a method for monitoring fouling of membranes of a desalination or water softening plant comprising RO membranes, NF membranes, or a combination thereof. Such a method will now be described with reference to FIG. 4, which is a block diagram of steps in a method II for monitoring fouling of membranes of a desalination or water softening plant comprising ultrafiltration (UF) membranes, reverse osmosis (RO) membranes, nanofiltration (NF) membranes, or a combination thereof, according to an embodiment of this disclosure. The method can comprise predicting, at 100, for one or more RO/NF skids, a time until which a cleaning in place (CIP) of the one or more RO/NF skids is indicated, wherein each of the one or more RO/NF skids comprises one or more RO/NF arrays, wherein each of the one or more RO/NF arrays comprises a plurality of RO units and each RO unit contains therein a plurality of RO membranes, a plurality of NF units and each NF unit contains therein a plurality of NF membranes, or a combination thereof, and may further comprise scheduling and/or initiating or performing CIPs on one or more RO/NF skids as indicated at 110. As discussed in part hereinabove with regard to controller 60 of FIG. 1, the predicting at 100 can comprise calculating and/or monitoring one or more RO/NF parameters at 102, comparing each of the one or more RO/NF parameters to a performance threshold, wherein the performance threshold indicates a time at which a cleaning in place (CIP) of the RO/NF skid based on that parameter is to be performed, and estimating a time until which each of the one or more RO/NF parameters will reach the performance threshold therefor at 103, and predicting as the time until which a cleaning in place (CIP) of the one or more RO/NF skids is indicated as the lowest time estimated from among the estimated times until which each of the one or more RO/NF parameters will reach the performance threshold therefor at 104. The one or more RO/NF parameters, the comparing, and the monitoring can be performed as described hereinabove with reference to the predictive system I for monitoring fouling of membranes of a desalination or water softening plant comprising UF membranes, RO membranes, NF membranes, or a combination thereof.

Scheduling of CIPs on one or more RO/NF skids can be effected by considering an estimated duration for an RO/NF CIP, the availability of one or more CIP skids, a production requirement for water from the plant (e.g., the need for blended water for low salinity or softened water EOR), the predicted time until which a cleaning of the one or more RO/NF skids is indicated, or a combination thereof, such that the scheduling allows for maintaining of the water production requirement during the cleaning of the one or more RO/NF skids, and ensures that a number of CIP skids required for the scheduled CIPs is less than an available number of CIP skids. As there may be a limited number of CIP skids (e.g., on a platform), scheduling of CIPs can take into account the number of available CIPs, in one or more embodiments.

In one or more embodiments, the calculating and/or monitoring, the comparing, and the predicting are carried out by a controller 60 comprising a processor 65, as described with reference to the embodiment of FIG. 1.

Also disclosed herein is a computer system operable for monitoring fouling of membranes of a desalination or water softening plant comprising UF membranes, RO membranes, NF membranes, or a combination thereof. The system comprises a controller 60 comprising a processor 65 as described hereinabove. With reference again to FIG. 1, processor 65 is configured to receive inputs at 101. For example, processor 65 may receive as inputs an inlet temperature, inlet pressure, outlet pressure, flow rate, or a combination thereof for one or more UF skids; receive as inputs inlet temperature, feed pressure, outlet pressure, feed flow rate, permeate flow rate, total dissolved solids (TDS) in the permeate streams from, or a combination thereof for one or more RO/NF skids; or a combination thereof. Processor 65 may be further configured to utilize the inputs at 102: for the one or more UF skids to calculate and/or monitor, for each of the one or more UF skids, one or more UF parameters, for the one or more RO/NF skids to calculate and/or monitor one or more RO/NF parameters; or a combination thereof. Processor 65 may be further operable to compare at 103: each of the one or more UF parameters to a performance threshold therefor, wherein the performance threshold indicates a time at which a cleaning in place (CIP) of the UF skid is to be performed, and predict an estimated time until which each of the one or more parameters of a UF skid will reach the performance threshold therefor; each of the one or more RO/NF parameters to a performance threshold therefor, wherein the performance threshold indicates a time at which a cleaning in place (CIP) of the RO/NF skid is to be performed, and predict an estimated time until which each of the one or more RO/NF parameters of an RO/NF skid will reach the performance threshold therefor; or a combination thereof. Processor 65 may be further configured to predict at 104 a time until which a cleaning in place (CIP) of each of the one or more RO/NF skids, UF skids, or both is indicated as the lowest time estimated from among the estimated times until which each of the one or more RO/NF parameters or UF parameters, respectively, will reach the performance threshold therefor.

As discussed hereinabove with reference to predictive system I of the embodiment of FIG. 1, controller 60 can further comprise a display or user interface 61, a network interface 62, or both, whereby the processor 65 can produce an output comprising a display for at least one of the one or more UF parameters, the one or more RO/NF parameters, or a combination thereof, an email alert indicating that at least one of the one or more UF parameters, the one or more RO/NF parameters, or a combination thereof has reached or exceeded an alert level, or both.

The one or more UF parameters, and the one or more RO/NF parameters may be as described in detail hereinabove with reference to the embodiment of FIG. 1. As discussed hereinabove, processor 65 can be further operable to monitor a trend in the one or more UF parameters, the one or more RO/NF parameters, or a combination thereof, and compare the monitored trend with data in a memory 66 of the processor 65 to produce an output indicating a potential cause of the fouling of the membranes of a UF skid and/or an RO/NF skid for which a CIP is indicated. The processor 65 can be further configured to provide a suggested schedule for and/or initiate performing CIPs on one or more of the one or more UF skids, one or more of the one or more RO/NF skids, or a combination thereof, based on data inputted into memory 66 of the processor 65 regarding an estimated duration for a UF skid CIP and/or an RO/NF skid CIP, the availability of one or more CIP skids, a production requirement for water from the desalination or water softening plant, the predicted time until which a cleaning of the one or more of the one or more UF skids, the one or more of the one or more RO/NF skids, or the combination thereof is indicated, or a combination thereof.

The herein-disclosed predictive method, system, and tool can be utilized to monitor and maintain performance of membranes in a desalination or water softening plant. The herein-disclosed method, system, and tool utilize a performance monitoring software of a processor to interact with UF and/or RO/NF sensors, such as pressure sensors and flow rate sensors in the arrays or banks and sensors that determine how the composition (e.g., TDS or concentrations of individual ions or types of individual ions) of the permeate and/or retentate/concentrate is changing over time. In one or more embodiments, the performance monitoring software produces a display (e.g., a graph, alert, and/or other display) to visually indicate the performance of the arrays, banks, or rows of each skid. This graph or other display can allow an operator or engineer to see what is happening at the membrane surface and to determine which cleaning routine to use, or, in one or more embodiments, the processor can perform root cause analysis of the monitored parameters/trends to provide or initiate a suitable response.

The processor may monitor and/or highlight trends in one or more UF or RO/NF parameters. The performance monitoring tool predicts when the situation will become unacceptable (i.e., reach a maximum permitted or threshold value). This can allow a user or a controller to determine when to initiate a cleaning. The performance monitoring tool may project forward for a number of days, for example, 30 days (i.e., provide a prediction of the rate of change of one or more monitored parameters) and may schedule or initiate commencement of a clean in a certain time period. The estimated time for a clean may take into account predictions on the amount of the low salinity or softened injection water required for the injection system over time and bottlenecks in the production of the low salinity injection water (e.g. when an array is out of action for servicing or there is currently a plan to clean another array), etc. In this manner, a cleaning may be effected on a day when there is less demand for the injection water or a day when there is no predicted bottleneck in water production.

By enabling monitoring of key performance indicators and trends thereof, the method, system, and tool of this disclosure can facilitate membrane management, potentially decreasing a frequency of CIPs and thereby reducing the aging of the membranes and increasing operational uptime.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Having disclosed a number of systems and methods, various embodiments can include, but are not limited to:

A: A predictive system for monitoring fouling of membranes of a desalination or water softening plant comprising ultrafiltration (UF) membranes, reverse osmosis (RO) membranes, nanofiltration (NF) membranes, or a combination thereof, the system comprising: one or more UF skids comprising a plurality of UF units, each UF unit containing therein a plurality of UF membranes; one or more RO/NF skids comprising one or more RO/NF arrays, wherein each of the one or more RO/NF arrays comprises a plurality of RO units, with each RO unit containing therein a plurality of RO membranes, a plurality of NF units, with each NF unit containing therein a plurality of NF membranes; or a combination thereof, UF sensors configured to measure one or more of inlet temperature, inlet pressure, outlet pressure, flow rate, or a combination thereof for each of the one or more UF skids; RO/NF sensors configured to measure inlet temperature, feed pressure, outlet pressure, feed flow rate, permeate flow rate, total dissolved solids (TDS) in the permeate stream, or a combination thereof for each of the one or more RO/NF arrays; or a combination thereof; and a controller comprising a processor in signal communication with the UF sensors, the RO/NF sensors, or a combination thereof, wherein the controller is configured to: receive data from one or more of the UF sensors, the RO/NF sensors, or both; calculate, utilizing the data from one or more of the UF sensors, for each of the one or more UF skids, one or more UF parameters; compare each of the one or more UF parameters to a first performance threshold, wherein the first performance threshold indicates a time at which a cleaning in place (CIP) of the UF skid is to be performed; predict an estimated time until which the one or more UF parameters will reach the first performance threshold; calculate, utilizing the data from one or more of the RO/NF sensors, one or more RO/NF parameters; compare each of the one or more RO/NF parameters to a second performance threshold, wherein the second performance threshold indicates a time at which a cleaning in place (CIP) of the RO/NF skid is to be performed; and predict an estimated time until which the one or more RO/NF parameters will reach the second performance threshold.

B: A method for monitoring fouling of membranes of a desalination or water softening plant comprising reverse osmosis (RO) membranes, nanofiltration (NF) membranes, or a combination thereof, the method comprising: predicting, for one or more RO/NF skids, a time until which a cleaning in place (CIP) of the one or more RO/NF skids is indicated, wherein each of the one or more RO/NF skids comprises one or more RO/NF arrays, wherein each of the one or more RO/NF arrays comprises a plurality of RO units and each RO unit contains therein a plurality of RO membranes, a plurality of NF units and each NF unit contains therein a plurality of NF membranes, or a combination thereof, wherein the predicting comprises: calculating and/or monitoring one or more RO/NF parameters, comparing each of the one or more RO/NF parameters to a performance threshold, wherein the performance threshold indicates a time at which a cleaning in place (CIP) of the RO/NF skid based on that parameter is to be performed, and estimate a time until which each of the one or more RO/NF parameters will reach the performance threshold therefor, and predicting as the time until which a cleaning in place (CIP) of the one or more RO/NF skids is indicated as the lowest time estimated from among the estimated times until which each of the one or more RO/NF parameters will reach the performance threshold therefor.

C: A computer system operable for monitoring fouling of membranes of a desalination or water softening plant comprising ultrafiltration (UF) membranes, reverse osmosis (RO) membranes, nanofiltration (NF) membranes, or a combination thereof, the system comprising: a controller comprising a processor configured to: receive as inputs: for one or more UF skids comprising a plurality of UF units, each UF unit containing therein a plurality of UF membranes: an inlet temperature, inlet pressure, outlet pressure, flow rate, or a combination thereof; for one or more RO/NF skids comprising one or more RO/NF arrays, wherein each of the one or more RO/NF arrays comprises a plurality of RO units, each RO unit containing therein a plurality of RO membranes, a plurality of NF units, each NF unit containing therein a plurality of NF membranes, or a combination thereof: inlet temperature, feed pressure, outlet pressure, feed flow rate, permeate flow rate, total dissolved solids (TDS) in the permeate streams from, or a combination thereof for each of the one or more RO/NF arrays; or a combination thereof, utilize the inputs: for the one or more UF skids to calculate and/or monitor, for each of the one or more UF skids, one or more UF parameters, for the one or more RO/NF skids to calculate and/or monitor one or more RO/NF parameters; or a combination thereof; compare: each of the one or more UF parameters to a first performance threshold therefor, wherein the first performance threshold indicates a time at which a cleaning in place (CIP) of the UF skid is to be performed, and predict an estimated time until which each of the one or more UF parameters will reach the first performance threshold therefor; each of the one or more RO/NF parameters to a second performance threshold therefor, wherein the second performance threshold indicates a time at which a cleaning in place (CIP) of the RO/NF skid is to be performed, and predict an estimated time until which each of the one or more RO/NF parameters will reach the second performance threshold therefor; or a combination thereof; and predict a time until which a cleaning in place (CIP) of each of the one or more RO/NF skids, UF skids, or both is indicated as the lowest time estimated from among the estimated times until which each of the one or more RO/NF parameters or UF parameters, will reach the first performance threshold or the second performance threshold, respectively.

Each of embodiments A, B, and C may have one or more of the following additional elements:

Element 1: wherein the controller further comprises a display, a network interface, or both, and wherein the processor is configured to produce an output comprising a display of an alert for at least one of the one or more UF parameters, the one or more RO/NF parameters, or a combination thereof, an email alert indicating that at least one of the one or more UF parameters, the one or more RO/NF parameters, or a combination thereof has reached or exceeded an alert level, or both. Element 2: wherein the controller is further configured to: provide a continuous display of the displayed parameter, and wherein the alert provides a visual indication of how close a value of the displayed parameter is to the threshold therefor. Element 3: wherein the controller is configured to provide a value of a displayed parameter, but less than or equal to the alert level therefor. Element 4: wherein the controller is configured to calculate a rate of fouling based on at least one of each of the one or more parameters or an average change in that parameter over a rate of fouling time period, and wherein the controller is configured to predict an estimated time until a skid will reach a performance threshold for that parameter by dividing a difference between the current value of that parameter and a threshold value for that parameter by the average change in that parameter over the rate of fouling time period. Element 5: wherein the rate of fouling comprises a differential pressure (DP) rate of fouling calculated based on an average increase in normalized DP over a rate of fouling time period, and wherein the time until a DP performance threshold is reached is estimated by dividing a difference between the current DP and a threshold DP by the average DP rate of fouling. Element 6: wherein the controller is further operable to monitor a trend in the one or more UF parameters, the one or more RO/NF parameters, or a combination thereof, and compare the monitored trend with data in a memory thereof to produce an output indicating a potential cause of the membrane fouling. Element 7: wherein the controller is further configured to provide a suggested schedule for performing CIPs on one or more of the UF skids, one or more of the RO/NF skids, or a combination thereof, based on data inputted into a memory thereof regarding an estimated duration for a UF CIP and/or an RO/NF CIP, the availability of one or more CIP skids, a production requirement for water from the desalination or water softening system, the predicted time until which a cleaning of each of the one or more of the UF skids, the one or more of the RO/NF skids, or a combination thereof is indicated, or a combination thereof. Element 8: wherein the one or more UF parameters are selected from: a normalized feed flow rate, a normalized transmembrane pressure (TMP), a highest normalized TMP in a TMP reference time period, a skid flux, a specific skid flux calculated as the flow rate per surface area divided by the TMP, a temperature corrected specific flux (TCSF), a lowest specific flux in a lowest flux reference time period, a backwash (BW) frequency, a CEB frequency, a TMP increase after a routinely scheduled chemically enhanced backwash (CEB), a number of CIPs in a CIP reference time period, a volume of liquid introduced into a UF skid during a BW or CEB, a BW duration, a pressure decay rate (PDR), a pressurization rate, or a combination thereof; wherein the one or more RO/NF parameters are selected from: a normalized feed pressure for each of the one or more RO/NF arrays, a normalized feed flow rate for each of the one or more RO/NF arrays, a normalized differential pressure (DP) for each of the one or more RO/NF arrays, a net driving pressure (NDP, which equals the feed pressure minus an osmotic pressure and a permeate back pressure) for each of the one or more RO/NF arrays, a recovery ratio equal to the permeate flow rate divided by the feed flow rate for each of the one or more RO/NF arrays, an average TDS in the permeate from each of the one or more RO/NF arrays, a normalized salt passage (SP) for each of the one or more RO/NF arrays, a normalized permeate flow rate for each of the one or more RO/NF arrays, a rate of fouling for each of the one or more RO/NF arrays, a CIP cleaning frequency for each of the RO/NF skids, a TDS skid discrepancy which is the difference of an outlet TDS of an RO/NF skid from an outlet TDS of one or more of the other RO/NF skids, or a combination thereof; or a combination thereof. Element 9: wherein the one or more UF parameters comprise the lowest specific flux in the lowest flux reference time period, and wherein the lowest specific flux reference time period is 24 hours, wherein the TMP reference time period is 24 hours, wherein a routinely scheduled CEB is a daily CEB, wherein a CIP reference time period is three months, or a combination thereof. Element 10: wherein the one or more UF parameters comprise the lowest specific flux, the volume of liquid introduced into a UF skid during a BW or CEB, the BW frequency, or a combination thereof. Element 11: wherein the one or more RO/NF parameters are selected from the rate of fouling, the CIP cleaning frequency, the TDS skid discrepancy, or a combination thereof. Element 12: wherein the normalized feed flow rate is normalized against a reference temperature and/or net driving pressure, wherein the normalized feed pressure is the feed pressure normalized against a reference flow rate, wherein the normalized SP is the SP normalized to a reference flow rate and reference temperature, wherein the normalized TMP is the TMP normalized against a reference flow rate, wherein the normalized DP is the DP normalized against a reference temperature and reference flow rate, wherein the normalized permeate flow rate is the permeate flow rate normalized against reference temperature and reference NDP, or a combination thereof, and wherein the reference temperature, the reference flow rate, the reference net driving pressure, or a combination are those values on a first day of operation. Element 13: wherein the CEB frequency comprises the number of CEBs in 7 days, wherein the CIP cleaning frequency for each of the RO/NF skids comprises the number of CIP cleans per year, wherein the BW frequency comprises the number of BWs in a 24 hour period, or a combination thereof.

Element 14: wherein comparing further comprises determining a rate of fouling based on at least one of the one or more RO/NF parameters by calculating an average change in that parameter over a rate of fouling time period, and estimating the time until which the at least one parameter will reach a performance threshold therefor by dividing a difference between the current value of the at least one parameter and the threshold value for that parameter by the rate of fouling based on that parameter. Element 15: wherein the one or more parameters comprises the normalized differential pressure (DP), wherein the rate of fouling comprises a DP rate of fouling calculated based on an average increase in normalized DP over a rate of fouling time period, and wherein the time until a DP performance threshold is reached is estimated by dividing a difference between the current DP and a threshold DP by the average DP rate of fouling. Element 16: wherein monitoring comprises monitoring a trend of the one or more RO/NF parameters to determine a potential cause of the fouling of the membranes. Element 17: further comprising scheduling CIPs on one or more RO/NF skids by considering an estimated duration for an RO/NF CIP, the availability of one or more CIP skids, a production requirement for water from the plant, the predicted time until which a cleaning of the one or more RO/NF skids is indicated, or a combination thereof, such that the scheduling allows for maintaining of the water production requirement during the cleaning of the one or more RO/NF skids, and a number of CIP skids required for the scheduled CIPs is less than an available number of CIP skids. Element 18: wherein the calculating and/or monitoring, the comparing, and the predicting are carried out by a controller comprising a processor. Element 19: wherein the one or more RO/NF parameters are selected from: a normalized feed pressure for each of the one or more RO/NF arrays, a normalized feed flow rate for each of the one or more RO/NF arrays, a normalized differential pressure (DP) for each of the one or more RO/NF arrays, a net driving pressure (NDP, which equals the feed pressure minus an osmotic pressure and a permeate back pressure) for each of the one or more RO/NF arrays, a recovery ratio equal to the permeate flow rate divided by the feed flow rate for each of the one or more RO/NF arrays, a TDS in the permeate from each of the one or more RO/NF arrays, a normalized salt passage (SP) for each of the one or more RO/NF arrays, a normalized permeate flow rate for each of the one or more RO/NF arrays, a rate of fouling for each of the one or more RO/NF arrays, a CIP cleaning frequency for each of the one or more RO/NF skids, a TDS skid discrepancy which is the difference of an outlet TDS of an RO/NF skid from an outlet TDS of one or more of the other RO/NF skids, or a combination thereof. Element 20: wherein the one or more RO/NF parameters are selected from the rate of fouling of the one or more RO/NF arrays, the CIP cleaning frequency per RO/NF skid, the TDS skid discrepancy, or a combination thereof. Element 21: wherein the normalized feed pressure is the feed pressure normalized against a reference flow rate, wherein the normalized feed flow rate is the feed flow rate normalized against a reference temperature and/or NDP, wherein the normalized SP is the SP normalized to a reference flow rate and reference temperature, wherein the normalized DP is the DP normalized against a reference temperature and reference flow rate, wherein the normalized permeate flow rate is the permeate flow rate normalized against reference temperature and reference NDP, or a combination thereof, and wherein the reference temperature, the reference flow rate, the reference net driving pressure, or a combination are those values on a first day of operation. Element 22: wherein the CIP cleaning frequency for each of the one or more RO/NF skids is the number of CIPs per year.

Element 23: wherein a rate of fouling for each of the one or more UF parameters, the one or more RO/NF parameters, or a combination thereof, is calculated based on an average change in that parameter over a rate of fouling time period, and wherein the estimated time until the skid will reach a performance threshold for that parameter is predicted by dividing a difference between a current value of that parameter and a threshold value for that parameter by the average change in that parameter over the rate of fouling time period. Element 24: wherein the processor is further operable to monitor a trend in the one or more UF parameters, the one or more RO/NF parameters, or a combination thereof, and compare the monitored trend with data in a memory of the processor to produce an output indicating a potential cause of the fouling of the membranes of a UF skid and/or an RO/NF skid for which a CIP is indicated. Element 25: wherein the processor is further configured to provide a suggested schedule for performing CIPs on one or more of the one or more UF skids, one or more of the one or more RO/NF skids, or a combination thereof, based on data inputted into a memory of the processor regarding an estimated duration for a UF skid CIP and/or an RO/NF skid CIP, the availability of one or more CIP skids, a production requirement for water from the desalination or water softening plant, the predicted time until which a cleaning of the one or more of the one or more UF skids, the one or more of the one or more RO/NF skids, or the combination thereof is indicated, or a combination thereof. Element 26: wherein the one or more UF parameters comprise the lowest specific flux, the volume of liquid introduced into a UF skid during a BW or CEB, the BW frequency, or a combination thereof. Element 27: wherein the one or more RO/NF parameters are selected from the rate of fouling, the CIP cleaning frequency, the TDS skid discrepancy, or a combination thereof Element 28: wherein the lowest specific flux reference time period is 24 hours, wherein the TMP reference time period is 24 hours, wherein a routinely scheduled CEB is a daily CEB, wherein a CIP reference time period is three months, or a combination thereof. Element 29: wherein the reference temperature, the reference flow rate, the reference net driving pressure, or a combination are those values on a first day of operation. Element 30: wherein the CEB frequency comprises the number of CEBs in 7 days, wherein the CIP cleaning frequency for each of the RO/NF skids comprises the number of CIP cleans per year, wherein the BW frequency comprises the number of BWs in a 24 hour period, or a combination thereof.

While certain embodiments have been shown and described, modifications thereof can be made by one skilled in the art without departing from the teachings of this disclosure.

Numerous other modifications, equivalents, and alternatives, will become apparent to those skilled in the art once the above disclosure is fully appreciated. It is intended that the following claims be interpreted to embrace such modifications, equivalents, and alternatives where applicable. Accordingly, the scope of protection is not limited by the description set out above but is only limited by the claims which follow, that scope including equivalents of the subject matter of the claims.

What is claimed is:

1. A predictive system for monitoring fouling of membranes of a desalination or water softening plant comprising ultrafiltration (UF) membranes, reverse osmosis (RO) membranes, nanofiltration (NF) membranes, or a combination thereof, the system comprising:
one or more UF skids comprising a plurality of UF units, each UF unit containing therein a plurality of UF membranes;
one or more RO/NF skids comprising one or more RO/NF arrays, wherein each of the one or more RO/NF arrays comprises:
a plurality of RO units, with each RO unit containing therein a plurality of RO membranes,
a plurality of NF units, with each NF unit containing therein a plurality of NF membranes, or
a combination thereof;
UF sensors configured to measure one or more of inlet temperature, inlet pressure, outlet pressure, flow rate, or a combination thereof for each of the one or more UF skids;
RO/NF sensors configured to measure inlet temperature, feed pressure, outlet pressure, feed flow rate, permeate flow rate, total dissolved solids (TDS) in the permeate stream, or a combination thereof for each of the one or more RO/NF arrays; or
a combination thereof; and
a controller comprising a processor in signal communication with the UF sensors, the RO/NF sensors, or a combination thereof, wherein the controller is configured to:
receive data from one or more of the UF sensors, the RO/NF sensors, or both;
calculate, utilizing the data from one or more of the UF sensors, for each of the one or more UF skids, one or more UF parameters;
compare each of the one or more UF parameters to a first performance threshold, wherein the first performance threshold indicates a time at which a cleaning in place (CIP) of a UF skid is to be performed;
predict an estimated time until which the one or more UF parameters will reach the first performance threshold;
calculate, utilizing the data from one or more of the RO/NF sensors, one or more RO/NF parameters;
compare each of the one or more RO/NF parameters to a second performance threshold, wherein the second performance threshold indicates a time at which a cleaning in place (CIP) of an RO/NF skid is to be performed; and
predict an estimated time until which the one or more RO/NF parameters will reach the second performance threshold.

2. The system of claim 1, wherein the controller further comprises a display, a network interface, or both, and wherein the processor is configured to produce an output for at least one of the one or more UF parameters, the one or more RO/NF parameters, or a combination thereof, an email alert indicating that at least one of the one or more UF parameters, the one or more RO/NF parameters, or a combination thereof has reached or exceeded an alert level, or both.

3. The system of claim 2, wherein the controller is further configured to:
provide a continuous display of the displayed parameter.

4. The system of claim 3, wherein the controller is configured to provide a first alert display when the value of a displayed parameter is greater than a threshold level, but less than or equal to the alert level therefore.

5. The system of claim 1, wherein the controller is configured to calculate a rate of fouling based on at least one of each of the one or more parameters or an average change in that parameter over a rate of fouling time period, and wherein the controller is configured to predict an estimated time until a skid will reach a performance threshold for that parameter by dividing a difference between the current value of that parameter and a threshold value for that parameter by the average change in that parameter over the rate of fouling time period.

6. The system of claim 5, wherein the rate of fouling comprises a differential pressure (DP) rate of fouling calculated based on an average increase in normalized DP over a rate of fouling time period, and wherein the time until a DP performance threshold is reached is estimated by dividing a difference between the current DP and a threshold DP by the average DP rate of fouling.

7. The system of claim 1, wherein the controller is further configured to monitor a trend in the one or more UF parameters, the one or more RO/NF parameters, or a combination thereof, and compare the monitored trend with data in a memory thereof to produce an output indicating a potential cause of the membrane fouling.

8. The system of claim 1, wherein the controller is further configured to provide a suggested schedule for performing CIPs on one or more of the UF skids, one or more of the RO/NF skids, or a combination thereof, wherein the suggested schedule for performing CIPs is based on data inputted into a memory thereof regarding an estimated duration for a UF CIP and/or an RO/NF CIP, the availability of one or more CIP skids, a production requirement for water from the desalination or water softening system, the predicted time until which a cleaning of each of the one or more of the UF skids, the one or more of the RO/NF skids, or a combination thereof.

9. The system of claim 1,
wherein the one or more UF parameters are selected from: a normalized feed flow rate, a normalized transmembrane pressure (TMP), a highest normalized TMP in a TMP reference time period, a skid flux, a specific skid flux calculated as the flow rate per surface area divided by the TMP, a temperature corrected specific flux (TCSF), a lowest specific flux in a lowest flux reference time period, a backwash (BW) frequency, a CEB frequency, a TMP increase after a routinely scheduled chemically enhanced backwash (CEB), a number of CIPs in a CIP reference time period, a volume of liquid introduced into a UF skid during a BW or CEB, a BW duration, a pressure decay rate (PDR), a pressurization rate, or a combination thereof;
wherein the one or more RO/NF parameters are selected from: a normalized feed pressure for each of the one or more RO/NF arrays, a normalized feed flow rate for each of the one or more RO/NF arrays, a normalized differential pressure (DP) for each of the one or more RO/NF arrays, a net driving pressure (NDP, which equals the feed pressure minus an osmotic pressure and a permeate back pressure) for each of the one or more RO/NF arrays, a recovery ratio equal to the permeate flow rate divided by the feed flow rate for each of the one or more RO/NF arrays, an average TDS in the permeate from each of the one or more RO/NF arrays, a normalized salt passage (SP) for each of the one or more RO/NF arrays, a normalized permeate flow rate for each of the one or more RO/NF arrays, a rate of fouling for each of the one or more RO/NF arrays, a CIP cleaning frequency for each of the RO/NF skids, a TDS skid discrepancy which is the difference of an outlet TDS of an RO/NF skid from an outlet TDS of one or more of the other RO/NF skids, or a combination thereof;

or a combination thereof.

10. The system of claim 9, wherein the one or more UF parameters comprise the lowest specific flux in the lowest flux reference time period, and wherein the lowest specific flux reference time period is 24 hours, wherein the TMP reference time period is 24 hours, wherein a routinely scheduled CEB is a daily CEB, wherein a CIP reference time period is three months, or a combination thereof.

11. The system of claim 9, wherein the one or more UF parameters comprise the lowest specific flux, the volume of liquid introduced into a UF skid during a BW or CEB, the BW frequency, or a combination thereof.

12. The system of claim 9, wherein the one or more RO/NF parameters are selected from the rate of fouling, the CIP cleaning frequency, the TDS skid discrepancy, or a combination thereof.

13. The system of claim 9, wherein the normalized feed flow rate is normalized against a reference temperature and/or net driving pressure, wherein the normalized feed pressure is the feed pressure normalized against a reference flow rate, wherein the normalized SP is the SP normalized to a reference flow rate and reference temperature, wherein the normalized TMP is the TMP normalized against a reference flow rate, wherein the normalized DP is the DP normalized against a reference temperature and reference flow rate, wherein the normalized permeate flow rate is the permeate flow rate normalized against reference temperature and reference NDP, or a combination thereof, and wherein the reference temperature, the reference flow rate, the reference net driving pressure, or a combination are those values on a first day of operation.

14. The system of claim 9, wherein the CEB frequency comprises the number of CEBs in 7 days, wherein the CIP cleaning frequency for each of the RO/NF skids comprises the number of CIP cleans per year, wherein the BW frequency comprises the number of BWs in a 24 hour period, or a combination thereof.

15. A method for monitoring fouling of membranes of a desalination or water softening plant comprising reverse osmosis (RO) membranes, nanofiltration (NF) membranes, or a combination thereof, the method comprising:
predicting, for one or more RO/NF skids, a time until which a cleaning in place (CIP) of the one or more RO/NF skids is indicated, wherein each of the one or more RO/NF skids comprises one or more RO/NF arrays, wherein each of the one or more RO/NF arrays comprises a plurality of RO units and each RO unit contains therein a plurality of RO membranes, a plurality of NF units and each NF unit contains therein a plurality of NF membranes, or a combination thereof, wherein the predicting comprises:
calculating and/or monitoring one or more RO/NF parameters,
comparing each of the one or more RO/NF parameters to a performance threshold, wherein the performance threshold indicates a time at which a cleaning in place (CIP) of the RO/NF skid based on that parameter is to be performed, and estimate a time until which each of the one or more RO/NF parameters will reach the performance threshold therefor, and
predicting as the time until which a cleaning in place (CIP) of the one or more RO/NF skids is indicated as the lowest time estimated from among the estimated times until which each of the one or more RO/NF parameters will reach the performance threshold therefor.

16. The method of claim 15, wherein comparing further comprises determining a rate of fouling based on at least one of the one or more RO/NF parameters by calculating an average change in that parameter over a rate of fouling time period, and estimating the time until which the at least one parameter will reach a performance threshold therefor by dividing a difference between the current value of the at least one parameter and the threshold value for that parameter by the rate of fouling based on that parameter.

17. The method of claim 16, wherein the one or more parameters comprises the normalized differential pressure (DP), wherein the rate of fouling comprises a DP rate of fouling calculated based on an average increase in normalized DP over a rate of fouling time period, and wherein the time until a DP performance threshold is reached is estimated by dividing a difference between the current DP and a threshold DP by the average DP rate of fouling.

18. The method of claim 15, wherein monitoring comprises monitoring a trend of the one or more RO/NF parameters to determine a potential cause of the fouling of the membranes.

19. The method of claim 15, further comprising scheduling CIPs on one or more RO/NF skids by considering an estimated duration for an RO/NF CIP, the availability of one or more CIP skids, a production requirement for water from the plant, the predicted time until which a cleaning of the one or more RO/NF skids is indicated, or a combination thereof, such that the scheduling allows for maintaining of the water production requirement during the cleaning of the one or more RO/NF skids, and a number of CIP skids required for the scheduled CIPs is less than an available number of CIP skids.

20. The method of claim 15, wherein the calculating and/or monitoring, the comparing, and the predicting are carried out by a controller comprising a processor.

21. The method of claim 15, wherein the one or more RO/NF parameters are selected from: a normalized feed pressure for each of the one or more RO/NF arrays, a normalized feed flow rate for each of the one or more RO/NF arrays, a normalized differential pressure (DP) for each of the one or more RO/NF arrays, a net driving pressure (NDP, which equals the feed pressure minus an osmotic pressure and a permeate back pressure) for each of the one or more RO/NF arrays, a recovery ratio equal to the permeate flow rate divided by the feed flow rate for each of the one or more RO/NF arrays, a TDS in the permeate from each of the one or more RO/NF arrays, a normalized salt passage (SP) for each of the one or more RO/NF arrays, a normalized permeate flow rate for each of the one or more RO/NF arrays, a rate of fouling for each of the one or more RO/NF arrays, a CIP cleaning frequency for each of the one or more RO/NF skids, a TDS skid discrepancy which is the difference of an outlet TDS of an RO/NF skid from an outlet TDS of one or more of the other RO/NF skids, or a combination thereof.

22. The method of claim 21, wherein the one or more RO/NF parameters are selected from the rate of fouling of the one or more RO/NF arrays, the CIP cleaning frequency per RO/NF skid, the TDS skid discrepancy, or a combination thereof.

23. The method of claim 21, wherein the normalized feed pressure is the feed pressure normalized against a reference flow rate, wherein the normalized feed flow rate is the feed flow rate normalized against a reference temperature and/or NDP, wherein the normalized SP is the SP normalized to a reference flow rate and reference temperature, wherein the normalized DP is the DP normalized against a reference temperature and reference flow rate, wherein the normalized permeate flow rate is the permeate flow rate normalized against reference temperature and reference NDP, or a combination thereof, and wherein the reference temperature, the reference flow rate, the reference net driving pressure, or a combination are those values on a first day of operation.

24. The method of claim 21, wherein the CIP cleaning frequency for each of the one or more RO/NF skids is the number of CIPs per year.

25. A computer system operable for monitoring fouling of membranes of a desalination or water softening plant comprising ultrafiltration (UF) membranes, reverse osmosis (RO) membranes, nanofiltration (NF) membranes, or a combination thereof, the system comprising:
a controller comprising a processor configured to:
 receive as inputs:
 for one or more UF skids comprising a plurality of UF units, each UF unit containing therein a plurality of UF membranes: an inlet temperature, inlet pressure, outlet pressure, flow rate, or a combination thereof;
 for one or more RO/NF skids comprising one or more RO/NF arrays, wherein each of the one or more RO/NF arrays comprises a plurality of RO units, each RO unit containing therein a plurality of RO membranes, a plurality of NF units, each NF unit containing therein a plurality of NF membranes, or a combination thereof: inlet temperature, feed pressure, outlet pressure, feed flow rate, permeate flow rate, total dissolved solids (TDS) in the permeate streams from, or a combination thereof for each of the one or more RO/NF arrays;
 or a combination thereof,
 utilize the inputs:
 for the one or more UF skids to calculate and/or monitor, for each of the one or more UF skids, one or more UF parameters,
 for the one or more RO/NF skids to calculate and/or monitor one or more RO/NF parameters;
 or a combination thereof;
 compare:
 each of the one or more UF parameters to a first performance threshold, wherein the first performance threshold indicates a time at which a cleaning in place (CIP) of the UF skid is to be performed, and predict an estimated time until which each of the one or more UF parameters will reach the first performance threshold;
 each of the one or more RO/NF parameters to a second performance threshold, wherein the second performance threshold indicates a time at which a cleaning in place (CIP) of the RO/NF skid is to be performed, and predict an estimated time until which each of the one or more RO/NF parameters of an RO/NF skid will reach the second performance threshold therefor;
 or a combination thereof; and
 predict a time until which a cleaning in place (CIP) of each of the one or more RO/NF skids, UF skids, or both is indicated as the lowest time estimated from among the estimated times until which each of the one or more RO/NF parameters or UF parameters will reach the first performance threshold or the second performance threshold, respectively.

26. The system of claim 25, wherein the controller further comprises a display, a network interface, or both, and wherein the processor produces an output comprising a display of an alert for at least one of the one or more UF parameters, the one or more RO/NF parameters, or a combination thereof, an email alert indicating that at least one of the one or more UF parameters, the one or more RO/NF parameters, or a combination thereof has reached or exceeded an alert level, or both.

27. The system of claim 26, wherein the controller provides a continuous display of each displayed parameter.

28. The system of claim 27, wherein a first alert is displayed when the value of a displayed parameter is greater than a threshold, but less than or equal to the alert level therefor.

29. The system of claim 25, wherein a rate of fouling for each of the one or more UF parameters, the one or more RO/NF parameters, or a combination thereof, is calculated based on an average change in that parameter over a rate of fouling time period, and wherein the estimated time until the skid will reach a performance threshold for that parameter is predicted by dividing a difference between a current value of that parameter and a threshold value for that parameter by the average change in that parameter over the rate of fouling time period.

30. The system of claim 29, wherein the rate of fouling comprises a differential pressure (DP) rate of fouling calculated based on an average increase in normalized DP over a rate of fouling time period, and wherein the time until a DP performance threshold is reached is estimated by dividing a difference between the current DP and a threshold DP by the average DP rate of fouling.

31. The system of claim 25, wherein the processor is further operable to monitor a trend in the one or more UF parameters, the one or more RO/NF parameters, or a combination thereof, and compare the monitored trend with data in a memory of the processor to produce an output indicating a potential cause of the fouling of the membranes of a UF skid and/or an RO/NF skid for which a CIP is indicated.

32. The system of claim 25, wherein the processor is further configured to provide a suggested schedule for performing CIPs on one or more of the one or more UF skids, one or more of the one or more RO/NF skids, or a combination thereof, based on data inputted into a memory of the processor regarding an estimated duration for a UF skid CIP and/or an RO/NF skid CIP, the availability of one or more CIP skids, a production requirement for water from the desalination or water softening plant, the predicted time until which a cleaning of the one or more of the one or more UF skids, the one or more of the one or more RO/NF skids, or the combination thereof is indicated, or a combination thereof.

33. The system of claim 25:
wherein the one or more UF parameters are selected from:
 a normalized feed flow rate, a normalized transmembrane pressure (TMP), a highest normalized TMP in a TMP reference time period, a skid flux, a specific skid flux calculated as the flow rate per surface area divided by the TMP, a temperature corrected specific flux (TCSF), a lowest specific flux in a lowest flux reference time period, a backwash (BW) frequency, a CEB frequency, a TMP increase after a routinely scheduled CEB, a number of CIPs in a CIP reference time period, a volume of liquid introduced into a UF skid during a backwash (BW) or chemically enhanced backwash (CEB), a BW duration, a pressure decay rate (PDR), a pressurization rate, or a combination thereof;

wherein the one or more RO/NF parameters are selected from: a normalized feed pressure to each of the one or more arrays, a normalized feed flow rate, a normalized differential pressure (DP) for each of the one or more arrays, a net driving pressure (NDP, which equals the feed pressure minus an osmotic pressure and a permeate back pressure) for each of the one or more arrays, a recovery ratio equal to the permeate flow rate divided by the feed flow rate for each of the one or more arrays, a TDS in the permeate from each of the one or more arrays, a normalized salt passage (SP) for each of the one or more arrays, a normalized permeate flow rate, a CIP cleaning frequency for each of the RO/NF skids, a rate of fouling for each of the one or more arrays, a TDS discrepancy which is the difference of an outlet TDS of an RO/NF skid from an outlet TDS of one or more of the other RO/NF skids, or a combination thereof;

or a combination thereof.

34. The system of claim 33, wherein the one or more UF parameters comprise the lowest specific flux, the volume of liquid introduced into a UF skid during a BW or CEB, the BW frequency, or a combination thereof.

35. The system of claim 33, wherein the one or more RO/NF parameters are selected from the rate of fouling, the CIP cleaning frequency, the TDS skid discrepancy, or a combination thereof.

36. The system of claim 33, wherein the lowest specific flux reference time period is 24 hours, wherein the TMP reference time period is 24 hours, wherein a routinely scheduled CEB is a daily CEB, wherein a CIP reference time period is three months, or a combination thereof.

37. The system of claim 33, wherein the reference temperature, the reference flow rate, the reference net driving pressure, or a combination are those values on a first day of operation.

38. The system of claim 33, wherein the CEB frequency comprises the number of CEBs in 7 days, wherein the CIP cleaning frequency for each of the RO/NF skids comprises the number of CIP cleans per year, wherein the BW frequency comprises the number of BWs in a 24 hour period, or a combination thereof.

* * * * *